United States Patent
Schulz et al.

(10) Patent No.: US 11,352,490 B2
(45) Date of Patent: Jun. 7, 2022

(54) PROCESS FOR PRODUCTION OF IMPACT MODIFIED THERMOPLASTIC MOULDING COMPOSITION WITH IMPROVED PROCESSING AND IMPACT STRENGTH

(71) Applicant: INEOS STYROLUTION GROUP GMBH, Frankfurt am Main (DE)

(72) Inventors: Tobias Schulz, Cologne (DE); Gisbert Michels, Leverkusen (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 0 days.

(21) Appl. No.: 16/771,504

(22) PCT Filed: Dec. 10, 2018

(86) PCT No.: PCT/EP2018/084086
§ 371 (c)(1),
(2) Date: Jun. 10, 2020

(87) PCT Pub. No.: WO2019/115420
PCT Pub. Date: Jun. 20, 2019

(65) Prior Publication Data
US 2021/0179837 A1 Jun. 17, 2021

(30) Foreign Application Priority Data
Dec. 11, 2017 (EP) .................... 17206390

(51) Int. Cl.
*C08L 51/04* (2006.01)
*C08L 25/12* (2006.01)

(52) U.S. Cl.
CPC .............. *C08L 51/04* (2013.01); *C08L 25/12* (2013.01)

(58) Field of Classification Search
CPC ....... C08L 51/04; C08F 265/04; C08F 212/08
See application file for complete search history.

(56) References Cited

U.S. PATENT DOCUMENTS

| | | |
|---|---|---|
| 3,553,167 A | 1/1971 | Schnell et al. |
| 4,009,226 A | 2/1977 | Ott et al. |
| 4,075,134 A | 2/1978 | Morehouse, Jr. et al. |
| 4,156,069 A | 5/1979 | Prevorsek et al. |
| 4,181,788 A | 1/1980 | Wingler et al. |
| 4,224,419 A | 9/1980 | Swoboda et al. |
| 4,311,823 A | 1/1982 | Imai et al. |
| 4,329,268 A | 5/1982 | Chakrabarti et al. |
| 4,334,053 A | 6/1982 | Freitag et al. |
| 4,605,699 A | 8/1986 | Mitulla et al. |
| 4,747,959 A | 5/1988 | Ho et al. |
| 4,772,743 A | 9/1988 | Schmidt et al. |
| 4,788,253 A | 11/1988 | Hambrecht et al. |
| 4,880,875 A | 11/1989 | Wassmuth et al. |
| 4,982,014 A | 1/1991 | Freitag et al. |
| 5,100,945 A | 3/1992 | Schmidt et al. |
| 5,196,480 A | 3/1993 | Seitz et al. |
| 5,242,596 A | 9/1993 | Bachem et al. |
| 5,851,463 A | 12/1998 | Guntherberg et al. |
| 5,994,463 A | 11/1999 | Eckel et al. |
| 6,140,426 A | 10/2000 | Sarabi et al. |
| 6,525,172 B1 | 2/2003 | Barghoorn et al. |
| 6,797,784 B1 | 9/2004 | Zobel et al. |
| 8,440,764 B2 | 5/2013 | Niessner et al. |
| 2002/0172789 A1* | 11/2002 | Watson ................. B82Y 10/00 428/36.91 |
| 2003/0181583 A1 | 9/2003 | Duijzings et al. |
| 2007/0287799 A1 | 12/2007 | Ha et al. |
| 2011/0275763 A1 | 11/2011 | Niessner |
| 2016/0297957 A1 | 10/2016 | Boeckmann et al. |
| 2016/0304651 A1* | 10/2016 | Han ...................... C08F 265/04 |
| 2017/0145201 A1 | 5/2017 | Boeckmann et al. |
| 2018/0346715 A1* | 12/2018 | Krabbenborg ......... C08K 3/013 |
| 2019/0055388 A1 | 2/2019 | Fischer et al. |
| 2019/0135990 A1 | 5/2019 | Michels et al. |
| 2019/0264021 A1 | 8/2019 | Fischer et al. |

FOREIGN PATENT DOCUMENTS

| | | |
|---|---|---|
| CN | 103483494 A | 1/2014 |
| DE | 1260135 | 2/1968 |
| DE | 1495626 B1 | 6/1971 |
| DE | 2232877 A1 | 1/1974 |
| DE | 2420358 A1 | 12/1975 |
| DE | 2703376 A1 | 8/1977 |
| DE | 2714544 A1 | 10/1977 |
| DE | 2724360 A1 | 12/1977 |
| DE | 2826925 A1 | 1/1980 |
| DE | 3000610 A1 | 7/1980 |
| DE | 2940024 A1 | 4/1981 |
| DE | 3149358 A1 | 6/1983 |
| DE | 3414118 A1 | 10/1985 |
| DE | 3615607 A1 | 11/1987 |
| DE | 3639904 A1 | 6/1988 |
| DE | 19713509 A1 | 10/1988 |
| DE | 3832396 A1 | 2/1990 |
| DE | 3913509 A1 | 10/1990 |

(Continued)

*Primary Examiner* — Jeffrey C Mullis
(74) *Attorney, Agent, or Firm* — J.A. Lindeman & Co. PLLC

(57) ABSTRACT

The present invention relates to a process for producing a thermoplastic moulding composition comprising a thermoplastic copolymer A, a graft copolymer B and optionally a further polymer component C as well as optional further additives K, wherein the preparation of the graft copolymer B is carried out via emulsion polymerization, and wherein at least one surfactant S2 is used in grafting step of emulsion polymerization in a volume concentration in the range of 0.46 to 0.75 mol/m³, based on the volume of the graft copolymer B latex particles obtained; and wherein the mean particle diameter $D_w$ of the latex particles of graft copolymer B is in the range of 60 to 800 nm.

15 Claims, No Drawings

(56) References Cited

FOREIGN PATENT DOCUMENTS

| | | |
|---|---:|---|
| DE | 4126483 A1 | 2/1993 |
| DE | 19503545 A1 | 8/1996 |
| DE | 19907136 A1 | 8/2000 |
| EP | 0022200 A1 | 1/1981 |
| EP | 0026932 A2 | 4/1981 |
| EP | 0006503 B1 | 7/1982 |
| EP | 0111260 A1 | 6/1984 |
| EP | 0450485 B1 | 11/1994 |
| EP | 0735077 A1 | 10/1996 |
| EP | 1133529 B1 | 7/2005 |
| GB | 1124911 A | 8/1968 |
| WO | 02/10222 A1 | 2/2002 |
| WO | 2007/142473 A1 | 12/2007 |
| WO | 2015/078751 A1 | 6/2015 |
| WO | 2015/150223 A1 | 10/2015 |
| WO | 2017/055179 A1 | 4/2017 |
| WO | 2017/211783 A1 | 12/2017 |
| WO | 2018/060111 A1 | 4/2018 |

\* cited by examiner

PROCESS FOR PRODUCTION OF IMPACT MODIFIED THERMOPLASTIC MOULDING COMPOSITION WITH IMPROVED PROCESSING AND IMPACT STRENGTH

The present invention relates to a process for producing a thermoplastic moulding composition comprising a thermoplastic copolymer A, a graft copolymer B and optionally a further polymer component C as well as optional further additives K, wherein the preparation of the graft copolymer B is carried out via emulsion polymerization, and wherein at least one surfactant S2 is used in grafting step of emulsion polymerization in a volume concentration in the range of 0.46 to 0.75 mol/m$^3$, based on the volume of the graft copolymer B latex particles obtained; and wherein the mean particle diameter $D_w$ of the latex particles of graft copolymer B is in the range of 60 to 800 nm.

Emulsion polymerization technique for production of polymer dispersions, so called emulsion rubbers or polymer latices, is widely known in the art. Polymer latices which are obtained by emulsion polymerization are used for a wide variety of applications, such as emulsion paints, paper coatings, leather finishing, textile finishing, and raw materials for adhesives. Further, it is known to use rubber components prepared by emulsion polymerization for preparation of impact modified thermoplastic resins.

In particular rubber components obtained by graft emulsion polymerization having a graft base and a graft shell are used in impact modified thermoplastic resins. Typically, solid graft copolymers, which may be isolated from the aqueous phase after graft emulsion polymerization, are incorporated into thermoplastic moulding compositions in order to improve the impact strength of the thermoplastic resin. For example it is known to incorporate graft copolymer rubbers, e.g. grafted crosslinked polyalkyl(meth)acrylate rubbers or grafted polybutadiene rubbers, into styrene (co)polymers, such as styrene-acrylonitrile copolymers (SAN) or α(alpha)-methylstyrene-acrylonitrile copolymers (AMSAN) in order to improve the impact strength of the respective thermoplastic polymer. Such acrylonitrile-butadiene-styrene copolymers (ABS) and acrylonitrile-styrene-acrylate copolymers (ASA) have been used for many years for the production of various mouldings, which can be used in many application, e.g. for the automotive or electronic sector. Generally such impact modified mouldings can be produced by polymerization of styrene and acrylonitrile (SAN matrix) in the presence of the graft latex or by mixing (e.g. via extrusion) the graft copolymer, which is prepared as latex and isolated separately, and the thermoplastic SAN matrix.

The synthesis of styrene-acrylonitrile copolymers is known in the arts and for example described in U.S. Pat. No. 8,440,764 or in Kunststoff-Handbuch (Vieweg-Daumiller, 15 volume V Polystyrol, Carl-Hanser-Verlag, München, 1969, page 124). The production of graft copolymers comprising at least one rubber is e.g. described in EP-A 0450485, DE 195034545 and DE 3149358. For example the production of thermoplastic resins comprising at least on acrylate based rubber is described in US 2011/0275763. Acrylonitrile styrene acrylate copolymer (ASA) materials are described for example in WO 2007/142473 and EP-B 0006503.

Generally, emulsion polymerization starts from an aqueous emulsion of one or more monomers in water, wherein the emulsion typically comprises one or more surfactants. The polymerization of the monomer is typically initiated by a water-soluble radical initiator. Generally, the polymerization takes places in the monomer droplets or micelles as well as in the latex polymer particles formed during the first few minutes of the polymerization. Typically, the latex particles are dispersed in the aqueous medium and surrounded by the surfactant, whereby the coagulation of the latex particles is reduced. Small rubber particles, having a defined particle size typically well below 1 μm, can normally be produced in the desired size by adjusting the surfactant concentration. Typically the surfactant concentration in emulsion polymerization is above the critical micelle concentration (CMC) of the particular surfactant. Graft emulsion polymerization is often carried out by preparing one or more polymer latex(es) as graft base in a first step and grafting one or more graft shell(s) onto the graft base by emulsion polymerization of further monomers in presence of the graft base in a second step. During the grafting step often additional surfactant is added to stabilize the emulsion during further particle growth.

The formation of coagulated latex particles, in particular during the grafting step of graft emulsion polymerization, is a serious problem, because coagulated latex particles (coagulum) result in loss of product and reduce the quality of the produced latices and the further processed products.

It is known from the prior art to filtrate polymer latices in order to remove coagulum. Filtration is for example described in Houben Weyl XIV/1, Makromolekulare Stoffe 1, pages 348 to 356 (Georg Thieme Verlag, Stuttgart, 1961) and also in DE-A-4 126 483 and U.S. Pat. No. 4,747,959. The document EP-B 1133529 describes styrene copolymers comprising less than 100 ppm of coarse particles, having a mean diameter from 200 to 500 μm, with improved impact strength, thermal stability, colour and elongation at break. According to said document the coarse particles are removed by means of filtration. However, the additional process step of filtration results in loss of product and a more complex and expensive process.

Thus, there is a need for improved and easy preparation processes of graft copolymers, wherein the formation of coagulated latex particles (coagulum) during emulsion polymerization is avoided or at least reduced.

Surprisingly it has been found that the amount of coagulum formed during emulsion polymerization of a latex (also referred to as rubbers in the following) is reduced when the concentration of the surfactant used in grafting step of emulsion polymerization, is controlled based on the volume concentration (concentration of surfactant based on the volume of the latex particles). In particular it has been found that the amount of coagulate is minimized using a surfactant volume concentration of more than 0.47 mol/m$^3$ and less than 0.76 mol/m$^3$, wherein the mean particle diameter $D_w$ of the latex particles is preferably in the range of 60 to 800 nm. Furthermore, it has been found that the physical and mechanical properties of thermoplastic moulding compositions comprising said optimized latex are improved.

The present invention is directed to a process for the preparation of a thermoplastic moulding composition comprising:

A: 5 to 95% by weight, preferably 40 to 90% by weight, more preferably 50 to 90% by weight, based on the total moulding composition, at least on thermoplastic copolymer A, which comprises at least one vinylaromatic monomer A1 and optionally at least one further ethylenically unsaturated monomer A2, B: 5 to 70% by weight, preferably 10 to 60% by weight, more preferably 10 to 50% by weight, based on the total moulding composition, at least one graft copolymer B comprising:

B1: 50 to 90% by weight, preferably 55 to 90% by weight, more preferably 55 to 65% by weight, based on the graft copolymer B, at least one graft base B1 obtained by emulsion polymerization of:
- B11: 70 to 99.9% by weight, preferably 87 to 99.5% by weight, based on the graft base B1, at least one $C_1$-$C_8$ alkyl(meth)acrylate, preferably at least one $C_4$-$C_8$-alkyl(meth)acrylate, more preferably n-butylacrylate and/or 2-ethylhexylacrylate, also preferably solely n-butylacrylate, as monomer B11:
- B12: 0.1 to 10% by weight, preferably 0.5 to 5% by weight, also preferably 0.5 to 3% by weight, more preferably 1 to 2.5% by weight, based on the graft base B1, at least on polyfunctional, cross-linking monomer B12; preferably selected from allyl (meth)acrylate, divinylbenzene, diallylmaleate, diallylfumarate, diallylphthalate, triallylcyanurat, triallylisocyanurat and dihydrodicyclopentadienylacrylate (DCPA), more preferably allyl(meth)acrylate and/or dihydrodicyclopentadienylacrylate (DCPA);
- B13 0 to 29.9% by weight, preferably 0 to 20% by weight, more preferably 0 to 10% by weight, also preferably 0.5 to 10% by weight, based on the graft base B1, at least one further copolymerizable, monoethylenically unsaturated monomer B13 different from B11 and B12, preferably selected from styrene, α(alpha)-methylstyrene, $C_1$-$C_4$-alkylstyrene, acrylonitrile, methacrylonitrile, isoprene, butadiene, chloroprene, methyl (meth)acrylate, alkylenglycol-di(meth)acrylate, and vinylmethylether, wherein the sum of B11, B12 and optional B13 is 100% by weight (based on all monomers of graft base B1); and B2: 10 to 50% by weight, also preferably 10 to 45% by weight, more preferably 35 to 45% by weight, based on the graft copolymer B, at least one graft shell B2, which is obtained by emulsion polymerization in the presence of the at least one graft base B1 of:
- B21 50 to 100% by weight, preferably 50 to 95% by weight, more preferably 65 to 80% by weight, also preferably 75 to 80% by weight, based on the graft shell B2, at least one vinylaromatic monomer B21, preferably selected from styrene, α(alpha) methylstyrene or mixtures of styrene and at least one further monomer selected from α(alpha)-methylstyrene, p(para)methylstyrene and $C_1$-$C_8$ alkyl(meth)acrylate (preferably $C_1$-$C_4$ alkyl(meth) acrylate, e.g. methyl methacrylate or ethyl methacrylate), and
- B22 0 to 50% by weight, preferably 5 to 50% by weight, more preferably 20 to 35% by weight, also preferably 20 to 25% by weight, based on the graft shell B2, at least one ethylenically unsaturated monomer B22, preferably selected from acrylonitrile or mixtures of acrylonitrile and at least one further monomer selected from methacrylonitrile, acrylamide, vinylmethyl ether, anhydrides of unsaturated carboxylic acids (e.g. maleic anhydride or phthalic acid anhydride) and imides of unsaturated carboxylic acids (e.g. N-substituted maleimides, like N-cyclohexylmaleimide or N-phenylmaleimide);

wherein the total sum of graft base B1 and graft shell B2 is 100% by weight;

C: 0 to 90% by weight, preferably 0 to 50% by weight, more preferably 5 to 20% by weight, based on the total moulding composition, at least one further polymer component C; and K: 0 to 40% by weight, preferably 0 to 10% by weight, more preferably 0.1 to 5% by weight, based on the total moulding composition, at least one further additive K;

wherein the process encompasses the steps:
a) preparation of the at least one graft base B1 via emulsion polymerization of the monomers B11, B12 and optional B13, wherein at least one surfactant S1 is added;
b) preparation of the at least one graft copolymer B via emulsion polymerization of the at least one monomer B21 and optional B22 in the presence of the at least one graft base B1, wherein at least one surfactant S2 is added before, during and/or after emulsion polymerization, wherein the graft copolymer B is obtained in form of a latex having a mean particle diameter $D_w$ in the range of 60 to 800 nm; and wherein the volume concentration of the total amount of surfactant S2 is in the range of 0.46 to 0.75 mol/m$^3$, based on the volume of the graft copolymer B latex particles;
c) precipitation of the graft copolymer B by mixing the graft copolymer latex obtained in step b) with a precipitation solution comprising at least one salt and/or acid;
d) mechanical dewatering, optional washing and/or optional drying of the precipitated graft copolymer B obtained in step c);
e) mixing of the precipitated graft copolymer B obtained in step d) with component A and optional the components C and/or K, wherein the thermoplastic moulding composition is obtained.

In a preferred embodiment the amounts of the components A and B are summed up to 100% by weight. In a further preferred embodiment the amounts of the components A and B and optional components C and/or K are summed up to 100% by weight. In particular the minimum and/or maximum amount of the thermoplastic copolymer A can be adapted so that the sum of the compounds results in 100% by weight.

In terms of the present invention, the term alkyl(meth) acrylate, e.g. methyl (meth)acrylate, encompasses the respective alkylacrylate, alkylmethacrylate and mixtures thereof, e.g. methylacrylate, methylmethacrylate and mixtures thereof.

Thermoplastic Copolymer A

Preferably the thermoplastic copolymer A comprising at least one vinylaromatic monomer is a resin which is free of any latex type polymer (rubber free resin).

Preferably the thermoplastic copolymer A comprises at least 50% by weight of one or more vinylaromatic monomer(s) A1, preferably selected from styrene, α(alpha) methylstyrene, p(para)-methylstyrene, and optionally at least one further ethylenically unsaturated monomer A2. Further, a preferred thermoplastic copolymer A is prepared from a mixtures of styrene with other co-monomers A2. In particular the at least one thermoplastic copolymer A, can be selected from polystyrene, copolymers of styrene, e.g. styrene acrylonitrile copolymers (SAN), copolymers of α(alpha)-methylstyrene, e.g. α(alpha)-methylstyrene acrylonitrile copolymers (AMSAN). In general, any SAN and/or AMSAN copolymer known in in the art may be used as thermoplastic copolymer A within the subject-matter of the present invention.

Particularly, the thermoplastic copolymer A is selected from SAN and/or AMSAN copolymers comprising less than 36% by weight of acrylonitrile as monomer A2, based on the copolymer A. Preferably the thermoplastic copolymer A comprises the at least one vinylaromatic monomer A1, preferably styrene, in an amount of 50 to 99% by weight, preferably 60 to 95% by weight, also preferably 65 to 90% by weight, more preferably 65 to 70% by weight, and at least one vinyl cyanide monomer A2, preferably acrylonitrile, in an amount of 1 to 50% by weight, preferably 5 to 40% by weight, also preferably 10 to 35% by weight, more preferably 30 to 35% by weight.

In a preferred embodiment the at least on thermoplastic copolymer A comprises (preferably consists of):
- A1: 50 to 99% by weight, preferably 50 to 95% by weight, more preferably 60 to 90% by weight, also preferably 60 to 85% by weight, based on the copolymer A, of the at least one vinylaromatic monomer A1, selected from styrene, α(alpha)-methylstyrene or mixtures of styrene and at least one further monomer selected from α(alpha)-methylstyrene, p(para)-methylstyrene and $C_1$-$C_8$ alkyl(meth)acrylate,
- A2: 1 to 50% by weight, 50 to 99% by weight, preferably 5 to 50% by weight, more preferably 10 to 40% by weight, also preferably 15 to 40% by weight, based on the copolymer A, of at least one further ethylenically unsaturated monomer A2, selected from acrylonitrile or mixtures of acrylonitrile and at least one further monomer selected from methacrylonitril, acrylamide, vinylmethyl ether, anhydrides of unsaturated carboxylic acids and imides of unsaturated carboxylic acids.

In particular, a thermoplastic copolymer A comprising 35% by weight or less, acrylonitrile, based on the total copolymer A, is preferred.

In a preferred embodiment of the invention the at least on vinylaromatic monomer A1 is styrene or alpha-methylstyrene, and the at least one further ethylenically unsaturated monomer A2 is acrylonitrile. In a further preferred embodiment of the invention monomer A1 is a mixture of styrene and α(alpha)-methylstyrene and monomer A2 is acrylonitrile, wherein the mixture preferably comprises at least 10% by weight, preferably at least 50% by weight and more preferably at least 90% by weight, based on the total amount of monomer A1, styrene.

In a preferred embodiment the thermoplastic copolymer A is composed of the monomers A1 and A2, wherein the at least one vinylaromatic monomer A1 is selected from styrene, α(alpha)-methylstyrene, and mixtures thereof; and the at least one further ethylenically unsaturated monomer A2 is acrylonitrile or a mixture of acrylonitrile and methacrylonitrile.

Especially preferred are thermoplastic copolymers A comprising (preferably consisting of):
- A1: 60 to 95% by weight, preferably 60 to 90% by weight, more preferably 60 to 85% by weight, also preferably 65 to 80% by weight, based on the total copolymer A, of the at least one vinylaromatic monomer A1, selected from styrene, α(alpha)-methylstyrene or mixtures of styrene and α(alpha)methylstyrene; and
- A2: 5 to 40% by weight, preferably 10 to 50% by weight, more preferably 15 to 40% by weight, also preferably 20 to 35% by weight, based on the total copolymer A, of the at least one further ethylenically unsaturated monomer A2, selected from acrylonitrile or mixtures of acrylonitrile and methacrylonitril.

In particular the weight-average molecular weight ($M_w$) of the thermoplastic copolymer A is in the range of 15,000 to 200,000 g/mol, preferably in the range of 30,000 to 150,000 g/mol. Typically, the number-average molar mass ($M_n$) of the thermoplastic copolymer A amounts from 15,000 to 100,000 g/mol. Preferably the average molecular weight can be determined by gel permeation chromatography (GPC) relative to polystyrene as standard and using for example UV detection. Preferably the thermoplastic copolymer A exhibits a viscosity number VN (determined according to DIN 53726 at 25° C., 0.5% by weight in dimethylformamide) from 50 to 120 ml/g, preferably from 50 to 100 ml/g, more preferably from 55 to 85 ml/g.

In a preferred embodiment the thermoplastic copolymer A is a SAN (styrene acrylonitrile copolymer) or AMSAN (alpha-methylstyrene acrylonitrile copolymer) copolymer, which exhibits average molecular weight and/or viscosity in the above mentioned ranges.

The copolymer A can be prepared by all known method, for example bulk polymerization, solution polymerization, suspension polymerization and emulsion polymerization or mixed process, e.g. mass/suspension polymerizations, with or without further components. Synthesis of thermoplastic copolymers A is possible via thermal initiation or via addition of initiators, especially radical initiators, like for example peroxides. Suitable thermoplastic copolymers A are preferably produced via bulk or solution polymerization.

More preferably the thermoplastic copolymer A is prepared from the components acrylonitrile and styrene and/or α-methylstyrene via bulk polymerization or in the presence of one or more solvents, for example, toluene or ethylbenzene. A polymerization process is for example described in Kunststoff-Handbuch [Plastics Handbook], Vieweg-Daumiller, volume V, (Polystyrol) [Polystyrene], Carl-Hanser-Verlag, Munich 1969, pages 122 et seq.

Details are described for example in U.S. Pat. Nos. 4,009,226 and 4,181,788 concerning the production of SAN and/or AMSAN resins by bulk polymerization or solution polymerization. Further, the synthesis of thermoplastic copolymer A is for example described in DE-A 24 20 358 and DE-A 27 24 360. Suitable thermoplastic copolymers are also described in DE-A 19713509.

Graft Copolymer B

Often the graft copolymer B has a complex structure and is in essence composed of one or more graft base(s) B1 and one or more graft shell(s) B2. Typically, the graft copolymer B is produced in form of a latex (rubber) by emulsion polymerization in steps a) and b), wherein firstly one or more graft base(s) B1 are obtained by emulsion polymerization of the monomers B11, B12 and optionally B13 as described and afterwards one or more graft shell(s) B2 are obtained by graft emulsion polymerization of the monomers B21 and B22 as described in the presence of one or more of the graft base B1. Preferably, the graft copolymer B latex is polymerized by aqueous free-radical emulsion polymerization. The reaction is typically initiated via water-soluble or oil-soluble free-radical polymerization initiators, e.g. inorganic or organic peroxides, such as peroxodisulfate or benzoyl peroxide, or with the aid of redox initiator systems. The documents WO 2002/10222, DE-A 28 26 925, and also EP-A 022 200 describe suitable polymerization processes.

The at least one graft copolymer B is present in the thermoplastic moulding composition in an amount of at least 5% by weight, preferably at least 10% by weight, more preferably at least 15% by weight, based on the total thermoplastic moulding composition.

Preferably, the graft copolymer B is selected from acrylonitrile styrene acrylate (ASA) graft copolymers comprising a crosslinked polyalkyl(meth)acrylate rubber as graft base B1, in particular a cross-linked polybutylacrylate graft base B1.

Typically, the graft base B1 consists of a polymer, preferably an at least partially crosslinked polymer, with glass transition temperature below 0° C., preferably below −20° C., more preferably below −40° C., wherein the glass transition temperature $T_g$ is measured by dynamic mechanical analysis (DMA) using a frequency of 1 Hz.

The at least one graft shell B2 typically consists of monomers which copolymerize yielding a polymer with a glass transition temperature or more than +20° C., preferably more than +60° C. Preferred monomers of graft shell B2 (monomers B21 and B22) are selected from styrene, α(alpha)-methylstyrene, (meth)acrylonitrile, methyl(meth)acrylate, ethylacrylate, N-phenylmaleic imide and maleic anhydride.

Preferred monomers B11 for producing graft base B1 are alkylacrylates and/or alkylmethacrylate (also referred to as alkyl(meth)acrylates) with 1 to 8, preferred 4 to 8, carbon atoms being present in the alkyl group. Preferably, the monomer B11 is selected from $C_4$-$C_8$ alkyl acrylates, preferably selected from butyl acrylate, ethylhexyl acrylate and cyclohexyl acrylate. Especially preferred is n-butylacrylate and/or 2-ethylhexylacrylate, more preferred is n-butylacrylate alone or in mixture with other monomers B11, as monomer B11.

In order to have cross-linking of the $C_1$-$C_8$-alkyl(meth)acrylate monomers B11 and therefore cross-linking of the graft base B1, monomers B11 are polymerized in presence of 0.1 to 10% by weight, preferred 0.1 to 5% by weight, preferred 0.5 to 3% by weight, preferred 1 to 4% by weight, more preferred 1 to 2.5% by weight, based on the graft base B1, of one or more polyfunctional, cross-linking monomer(s) B12. Suitable monomers B12 are especially polyfunctional, cross-linking monomers, that can be copolymerized with the mentioned monomers, especially B11 and B13. Suitable polyfunctional, cross-linking monomers B12 comprise two or more, preferred two or three, more preferred exactly two ethylenic double bonds, which are preferably not 1,3 conjugated. Examples for suitable polyfunctional, cross-linking monomers B12 are allyl(meth)acrylate, divinylbenzene, diallylester of carboxylic diacids, like e.g. diallymaleate, diallylfumarate and diallylphthalate. The acrylic acid ester of tricyclodecenyl alcohol (dihydrodicyclopentadienylacrylate, DCPA), as described in DE-A 1 260 135, represents also a preferred polyfunctional, cross-linking monomer B12.

Especially, the polyfunctional, cross-linking monomer B12 (preferably used for crosslinking of polyalkyl(meth)acrylate rubber) is at least one monomer selected from allyl(meth)acrylate, divinylbenzene, diallymaleate, diallylfumarate, diallylphthalate, triallylcyanurate, triallylisocyanurate and dihydrodicyclopentadienylacrylate (DCPA), preferred allyl(meth)acrylate, divinylbenzene, diallylmaleate, diallylfumarate, diallylphthalate and dihydrodicyclopentadienylacrylate (DCPA), preferably from ally(meth)acrylate and dihydrodicyclopentadienylacrylate (DCPA).

In a preferred embodiment 1 to 2.5% by weight, preferably 1.5 to 2.1% by weight, based on the graft base B1, dihydrodicyclopentadienylacrylate (DCPA) are used alone or in a mixture with at least one further of the above mentioned monomers B12, especially in mixture with allyl (meth)acrylate, as monomer B12.

Furthermore, the at least one graft base B1 can comprise optionally one or more copolymerizable, monoethylenically unsaturated monomers B13, different from B11 and B12. Monomers B13 can for example be selected from butadiene, isoprene, styrene, acrylonitrile, methyl(meth)acrylate and vinylmethylether. Preferably, the further monomer B13 is at least one monomer selected from styrene, α(alpha)-methylstyrene, acrylonitrile; methacrylonitrile, methyl(meth)acrylate, isoprene, chloroprene, and $C_1$-$C_4$ alkyl styrene.

In a preferred embodiment the vinylaromatic monomer B21 (in particular each of monomers B21, B21' and B21") is styrene and/or α(alpha)-methylstyrene and the at least one ethylenically unsaturated monomer B22 (in particular each of monomers B22 and B22") is acrylonitrile or a mixture of acrylonitrile and at least one monomer selected from methacrylonitrile, acrylamide, vinylmethylether, maleic acid anhydride, phthalic acid anhydride, N-cyclohexylmaleimide and N-phenylmaleimide. More preferably, monomers B21 and B22 used for emulsion polymerization of graft copolymer B are mixtures of styrene and acrylonitrile having a weight ratio of styrene to acrylonitrile in the range of 95:5 to 50:50, more preferred in the range of 80:20 to 65:35.

In a preferred embodiment the graft copolymer B comprises (preferably consists of):

B1: 55 to 75% by weight, based on the graft copolymer B, at least one graft base B1 obtained by emulsion polymerization of:
B11: 90 to 99.9% by weight, preferably 95 to 99.5% by weight, also preferably 97 to 99.5% by weight, more preferably 97.5 to 99% by weight, based on the graft base B1, at least one $C_1$-$C_8$ alkyl(meth)acrylate, preferably at least one $C_4$-$C_8$-alkyl(meth)acrylate, more preferably n-butylacrylate and/or 2-ethylhexylacrylate, also preferably solely n-butylacrylate, as monomer B11;
B12: 0.1 to 10% by weight, preferably 0.5 to 5% by weight, also preferably 0.5 to 3% by weight, more preferably 1 to 2.5% by weight, based on the graft base B1, at least on polyfunctional, cross-linking monomer B12; wherein the monomer B12 is selected from allyl(meth)acrylate, divinylbenzene, diallylmaleate, diallylfumarate, diallylphthalate, triallylcyanurat, triallylisocyanurat and dihydrodicyclopentadienylacrylate (DCPA), more preferably allyl(meth)acrylate and dihydrodicyclopentadienylacrylate (DCPA);
B13 optionally up to 9.9% by weight, preferably 0 to 9.9% by weight, more preferably 0 to 4.5% by weight, based on the graft base B1, at least one further copolymerizable, monoethylenically unsaturated monomer B13 different from B11 and B12, wherein the monomer B13 is selected from styrene, α(alpha)-methylstyrene, $C_1$-$C_4$-alkylstyrene, acrylonitrile, methacrylonitrile, isoprene, butadiene, chloroprene, methyl(meth)acrylate, alkylenglycol-di(meth)acrylate, and vinylmethylether,
wherein the sum of B11, B12 and optional B13 is 100% by weight (based on all monomers of graft base B1); and
B2: 25 to 45% by weight, based on the graft copolymer B, at least one graft shell B2, preferably one to three graft shells B2, wherein at least one graft shell B2 is obtained by emulsion polymerization in the presence of at least one graft base B1 of:
B21: 70 to 80% by weight, based on the graft shell B2, at least one vinylaromatic monomer B21, wherein the monomer B21 is selected from styrene, α(alpha)-methylstyrene and mixtures of styrene and one further monomer selected from α(alpha)-methylstyrene, p-methylstyrene, $C_1$-$C_4$-alkyl(meth)acrylate (e.g. methyl(meth)acrylate, ethyl(meth)acrylate), preferably selected from styrene, α(alpha)methylstyrene or mixtures of styrene and α(alpha)-methylstyrene or methyl(meth)acrylate, and B22: 20 to 30% by weight, based on the graft shell B2, at least one ethylenically unsaturated monomer B22, wherein the monomer B22 is selected from acrylonitrile or mixtures of acrylonitrile and at least one further monomer selected from methacrylonitril, acrylamide, vinylmethylether, anhydrides of unsaturated carboxylic acids (e.g. maleic acid anhydride, phthalic acid anhydride) and imides of unsaturated carboxylic acids (e.g. N-substituted maleimide, like N-cyclohexylmaleimide and N-phenylmalimide), preferably selected from acrylonitrile or mixtures of acrylonitrile and methacrylonitrile;

wherein the total sum of graft base(s) B1 and graft shell(s) B2 is 100% by weight.

In a preferred embodiment the at least one graft base B1 is obtained by emulsion polymerization of:

B11: 90 to 99.9% by weight, preferably 97 to 99.5% by weight, more preferably 97.5 to 99% by weight, based on the graft base B1, at least one $C_1$-$C_8$ alkyl(meth)acrylate, preferably at least one $C_4$-$C_8$-alkyl(meth)acrylate, more preferably n-butylacrylate and/or 2-ethylhexylacrylate, most preferably n-butylacrylate, as monomer B11; and B12: 0.1 to 10% by weight, preferably 0.5 to 3% by weight, more preferably 1 to 2.5% by weight, based on the graft base B1, at least one polyfunctional, cross-linking monomer B12; selected from allyl(meth)acrylate, divinylbenzene, diallylmaleate, diallylfumarate, diallylphthalate and dihydrodicyclopentadienylacrylate (DCPA), especially from allyl(meth)acrylate and/or dihydrodicyclopentadienylacrylate (DCPA);

wherein the sum of B11 and B12 is 100% by weight (based on all monomers of graft base B1).

In particular, further suitable compositions of graft base B1, comprising monomers B11, B12 and optionally B13, as well as the general method for its preparation are described for example in DE-A 28 26 925, DE-A 31 49 358 and DE-A 34 14 118.

In a preferred embodiment the at least one graft shell B2 is obtained by emulsion polymerization in the presence of the at least one graft base B1 of:

B21: 50 to 95% by weight, preferably 65 to 80% by weight, more preferably 70 to 80% by weight, based on the graft shell B2, at least one vinylaromatic monomer B21, wherein the monomer B21 is selected from styrene, α(alpha)-methylstyrene or mixtures of styrene and one further monomer selected from α(alpha)-methylstyrene, p(para)-methylstyrene, $C_1$-$C_4$-alkyl(meth)acrylate (e.g. methyl(meth)acrylate, ethyl(meth)acrylate), preferably selected from styrene, α(alpha)-methylstyrene or mixtures of styrene and α(alpha)-methylstyrene or methyl(meth)acrylate, and B22: 5 to 50% by weight, preferred 20 to 35% by weight, more preferred 20 to 30% by weight, based on the graft shell B2, at least one ethylenically unsaturated monomer B22, wherein the monomer B22 is selected from acrylonitrile or mixtures of acrylonitrile and at least one further monomer selected from methacrylonitrile, acrylamide, vinylmethylether, anhydrides of unsaturated carboxylic acids (e.g. maleic acid anhydride, phthalic acid anhydride) and imides of unsaturated carboxylic acids (e.g. N-substituted maleimide, like N-cyclohexylmaleimide and N-phenylmalimide), preferably selected from acrylonitrile or mixtures of acrylonitrile and methacrylonitrile.

Particularly, the graft copolymer B comprises a graft base B1, preferably a cross-linked polyalkyl(meth)acrylate rubber described above, and one or more graft shell(s) B2, in particular one, two or three graft shells B2, which differ in selection and amount of monomers B21 and B22 and which are obtained by stepwise grafting emulsion polymerization of the monomers B21 and/or B22 in the presence of graft base B1 res. in the presence of already grafted graft base.

In a preferred embodiment the graft copolymer B comprises at least one graft base B1, preferably a cross-linked polybutylacrylate rubber described above, and exactly one graft shell B2, obtained by emulsion polymerization of monomers B21 and B22 as described above, especially styrene and acrylonitrile, in presence of the graft base B1 (single-stage graft).

In a further preferred embodiment the graft copolymer B comprises at least one graft base B1, preferably a cross-linked polybutylacrylate rubber described above, and two graft shells B2' and B2", wherein B2' is obtained from emulsion polymerization of monomer B21, especially styrene, in presence of graft base B1 and the graft shell B2" is obtained from subsequent emulsion polymerization of monomers B21 and B22 as described above, especially styrene and acrylonitrile, in presence of graft base B1 grafted with B2' (two-stage graft).

In a preferred embodiment (single-stage graft) the graft copolymer B comprises:

B1: 50 to 70% by weight, preferably 55 to 65% by weight, more preferably 58 to 65% by weight, based on the graft copolymer B, at least one, preferably exactly one, graft base B1 as described above, wherein preferably the at least one graft base B1 has a mean particle diameter $D_w$ in the range of 60 to 200 nm, preferably 60 to 150 nm, more preferably 60 to 100 nm;

B2: 30 to 50% by weight, preferably 35 to 45% by weight, more preferably 35 to 42% by weight, based on the graft copolymer B, one or more, preferably exactly one graft shell B2, obtained by emulsion polymerization, in presence of at least one graft base B1, of:

B21: 50 to 95% by weight, preferably 65 to 80% by weight, more preferably 70 to 80% by weight, based on the graft base B, at least one vinylaromatic monomer B21, wherein the monomer B21 is selected from styrene, α(alpha)-methylstyrene or mixtures of styrene and at least one further monomer selected from α(alpha)-methylstyrene, p-methylstyrene and $C_1$-$C_4$-alkyl(meth)acrylate (e.g. methyl(meth)acrylate, ethyl(methacrylate), preferably selected from styrene, α(alpha)methylstyrene or mixtures of styrene with α(alpha)methylstyrene or methyl(meth)acrylate; and B22: 5 to 50% by weight, preferably 20 to 35% by weight, more preferably 20 to 30% by weight, based on the graft shell B2, at least one ethylenically unsaturated monomer B22, wherein the monomer B22 is selected from acrylonitrile or mixtures of acrylonitrile and at least one further monomer selected from methacrylonitrile, acrylamide, vinylmethylether, anhydrides of unsaturated carboxylic acids (e.g. maleic acid anhydride, phthalic acid anhydride) and imides of unsaturated carboxylic acids (e.g. N-substituted maleimide, like N-cyclohexylmaleimide and N-phenylmaleimide), preferably selected from acrylonitrile or mixtures of acrylonitrile an methacrylontrile;

wherein the total sum of graft base B1 and graft shell B2 is 100% by weight.

In another preferred embodiment (two-stage graft B2' and B2") the graft copolymer B comprises:

B1: 50 to 70% by weight, preferably 55 to 65% by weight, more preferably 58 to 65% by weight, based on the graft copolymer B, at least one, preferably exactly one, graft base B1 as described above, wherein preferably the at least one graft base B1 has a mean particle diameter $D_w$ in the range of 200 to 800 nm, preferably 300 to 600 nm, more preferably 350 to 550 nm;

B2': 10 to 30% by weight, preferably 10 to 20% by weight, more preferably 10 to 15% by weight, based on the graft copolymer B, at least one graft shell B2', which is obtained by emulsion polymerization, in presence of graft base B1, of B21' 100% by weight, based on graft shell B2', at least one vinylaromatic monomer B21', selected from styrene, α(alpha)methylstyrene or a mixture of styrene and at least one further monomer selected from α(alpha)-methylstyrene, p-methylstyrene and $C_1$-$C_4$-alkyl(meth)acrylate (e.g. methyl(meth)acrylate, ethyl(meth)acrylate); and B2": 20 to 40% by weight, preferably 20 to 30% by weight, more preferably 25 to 30% by weight, based on the graft copolymer B, at least one graft shell B2", which is obtained by emulsion polymerization, in presence of graft base B1 grafted with B2', of:

B21": 50 to 95% by weight, preferably 65 to 80% by weight, more preferably 70 to 80% by weight, based on the graft shell B2", at least one vinylaromatic monomer B21", selected from styrene, α(alpha)-methylstyrene or mixtures of styrene and at least one further monomer selected from alpha-methylstyrene, p-methylstyrene and $C_1$-$C_4$-alkyl(meth)acrylate (e.g. methyl(meth)acrylate, ethyl(meth)acrylate), preferably selected from styrene, α(alpha)-methylstyrene or mixtures of styrene and α(alpha)-methylstyrene or methyl(meth)acrylate; and B22": 5 to 50% by weight, preferably 20 to 35% by weight, more preferably 20 to 30% by weight, based on the graft shell B2", at least one ethylenically unsaturated monomer B22", selected from acrylonitrile or mixtures of acrylonitrile and at least one further monomer selected from methacrylonitrile, acrylamide, vinylmethylether, anhydrides of unsaturated carboxylic acids (e.g. maleic acid anhydride, phthalic acid anhydride) and imides of unsaturated carboxylic acids (e.g. N-substituted maleimide, like N-cyclohexylmaleimide and N-phenylmaleimide).

According to a preferred embodiment the graft copolymer B is a mixture of the above described embodiments of single-stage graft copolymer B and two-stage graft copolymer B (including graft B2' and B2").

More preferably monomers B21, B21' and B21" are styrene or mixtures of styrene and α(alpha)-methylstyrene.

More preferably monomers B22 and B22" are acrylonitrile or mixtures of acrylonitrile and at least one further monomer selected from methacrylonitrile, maleic acid anhydride, N-cyclohexylmaleimide, N-phenylmaleimide, more preferably acrylonitrile or mixtures of acrylonitrile and at least one further monomer selected from methacrylonitrile and maleic acid anhydride. In a more preferred embodiment of the invention monomers B21, B21' and B21" are styrene and monomers B22 and B22' are acrylonitrile.

In a preferred embodiment of the invention the inventive process covers the synthesis of at least two, preferably two, three or four, different graft copolymers B-I and B-II, wherein graft copolymers B-I and B-II differ in their mean particle diameter $D_w$. In this preferred embodiment graft copolymer B especially comprises at least two graft copolymers B-I and B-II, preferably based on crosslinked $C_1$-$C_8$ alkyl(meth)acrylate graft bases B1 as described above, wherein:

graft copolymer B-I (small size ASA rubber) has a mean particle diameter $D_w$ in the range of 60 to 200 nm, preferably of 80 to 150 nm, more preferably of 90 to 100 nm, and graft copolymer B-II (large size ASA rubber) has a mean particle diameter $D_w$ in the range of 300 to 800 nm, preferably of 300 to 700 nm, more preferably of 400 to 600 nm.

Graft copolymer B-I (small size ASA rubber) is preferably obtained by emulsion polymerization of monomers B21 and B22 as described above, in particular styrene or α(alpha)-methylstyrene as B21 and acrylonitrile as B22, in presence of the previously prepared graft base B1 (B1-I) as described above.

Preferably, the graft copolymer B-II (large size ASA rubber) is desired to have a narrow particle size distribution, wherein particle size distribution $Q=(D_{90}-D_{10})/D_{50}$ is less than 0.3, preferably less than 0.2.

Suitable crosslinked $C_1$-$C_8$ alkyl(meth)acrylate polymer graft bases B1 of graft copolymer B-II (referred to as B1-II) can be produced according to known procedures for the production of large size dispersion, conveniently via seeded polymerization, as described in DE 1 911 882 for the production of ASA polymers. According to this method a small size, cross-linked acrylate latex (seed latex) having a mean particle diameter $D_w$ from 50 to 180 nm, preferred less than 120 nm, which is obtained from emulsion polymerization of $C_1$-$C_8$-alkyl(meth)acrylates as monomers B11, cross-linking monomers B12 and optionally further co-monomers B13, is subjected to a further polymerization reaction. In particular, the reaction conditions are adjusted in way only allowing further growth of the present seed latex particles, without forming new latex particles (described in Journal of Applied Polymer Science, Vol. 9 1965, pages 2929 to 2938). Normally an initiator is used in said method. The particle size of the resulting graft copolymer B-II (large size rubber) can be adjusted by variation of the ratio of seed latex to monomers. Graft copolymer B-II is preferably obtained by emulsion polymerization of monomers B21 and B22 as described above, in particular styrene or α(alpha)methylstyrene as B21 and acrylonitrile as B22, in presence of the previously prepared graft base B1-II.

The thermoplastic moulding composition according to the invention can for example be prepared by combining the graft copolymers B-I and B-II, especially the graft copolymers B-I and B-II are mixed in step e) (mixing of the components). Preferably the above described graft copolymers B-I and B-II are prepared, precipitated and dewatered separately in steps a) to d). It is also possible to mix graft copolymers latices B-I and B-II after producing them separately in steps a) and b) and to precipitate them together in step c). Following steps, such as dewatering in step d) and mixing with other components in step e), can be carried out as described.

The weight ratio of graft copolymers B-I and B-II can be varied in wide ranges. Preferably the graft copolymer B is a mixture of graft copolymer B-I and B-II, wherein the weight ratio of B-I: B-II is from 90:10 to 10:90, preferably 80:20 to 20:80 and more preferably 70:30 to 35:65.

It is also possible to obtain graft copolymers with different particle sizes, especially bimodal particle size distributions from 60 to 200 nm and 300 to 800 nm, via known agglomeration procedures. Graft copolymers with large and small size particles are for example described in DE-A 36 15 607.

Furthermore graft copolymers B having two or more different graft shells B2 can be used as described above. Further, graft copolymers with multi-layer graft shells are for example described in EP-A 0111260 and WO 2015/078751.

Further Polymer Component C

Optionally, the thermoplastic moulding composition comprises 0 to 90% by weight, preferably 0 to 60% by weight, also preferably 0.5 to 30% by weight, more preferably 30 to 90% by weight, based on the total moulding composition, at least one further polymer component C. Preferably, the optional polymer component C is selected from polycarbonates (including aromatic polycarbonates and aromatic polyester carbonates), polyamides, and polyesters, more preferably from polycarbonates and polyamides.

In a preferred embodiment the thermoplastic moulding composition comprises 5 to 60% by weight, preferably 20 to 60% by weight, more preferably 30 to 60% by weight, based on the total moulding composition, at least one further polymer component P selected from polycarbonates, polyamides, and polyesters.

Preferably, the at least one further polymer component C is at least one aromatic polycarbonate and/or at least one aromatic polyester carbonate. Suitable aromatic polycarbonates and/or aromatic polyester carbonates are described in the state of the art and may be prepared by known processes. For example the preparation of aromatic polycarbonates is described in Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610 and DE-A 3 832 396. In particular the preparation of aromatic polycarbonate and/or aromatic polyester carbonate is carried out by reacting diphenols, preferably bisphenol A, carbonic acid halides, preferably phosgene, and optionally aromatic dicarboxylic acid halides, preferably benzenedicarboxylic acid halides. In particular suitable aromatic polycarbonates and aromatic polyester carbonates and their preparation are described in DE-A 2 714 544, DE-A 3 000 610, and DE-A 3 832 396.

The aromatic polycarbonate and/or aromatic polyester carbonates used as component C may be either linear or branched in a known manner. Branching agents which may be used are carboxylic acid chlorides which are trifunctional or more than trifunctional, for example described in DE-A 2 940 024, or phenols which are trifunctional or more than trifunctional.

Typically aromatic polycarbonates and polyester carbonates suitable as component C have average weight-average molecular weights ($M_w$, measured e.g. by ultracentrifuge or scattered light measurement) from 10,000 to 200,000 g/mol, preferably 15,000 to 80,000 g/mol, particularly preferably 24,000 to 32,000 g/mol.

The relative solution viscosity ($\eta_{rel}$) of the aromatic polycarbonates and polyester carbonates used as component C is typically in the range of 1.18 to 1.4, preferably 1.20 to 1.32 (measured on solutions of 0.5 g polycarbonate or polyester carbonate in 100 ml methylene chloride solution at 25° C.). The thermoplastic, aromatic polycarbonates and polyester carbonates may be employed by themselves or in any desired mixture of one or more, preferably one to three or one or two thereof. More preferably only one type of polycarbonate is used.

Preferably the aromatic polycarbonate used as component C is a polycarbonate based on bisphenol A and phosgene, which includes polycarbonates that have been prepared from corresponding precursors or synthetic building blocks of bisphenol A and phosgene.

Also preferably, the at least one further polymer component C can be at least one polyamide selected from homopolyamides, co-polyamides and mixtures of such polyamides. Suitable polyamides and methods for their production are known from the state of the art. In particular suitable semi-crystalline polyamides are polyamide-6, polyamide-6,6, mixtures and corresponding copolymers of those components. Also included are polyamides wherein the acid component consists wholly or partially of terephthalic acid, isophthalic acid, suberic acid, sebacic acid, azelaic acid, adipic acid and/or cyclohexanedicarboxylic acid, the diamine component consists wholly or partially of m- and/or p-xylylenediamine, hexamethylenediamine, 2,2,4-trimethylhexamethylenediamine, 2,2,4-trimethylhexamethylene-diamine and/or isophoronediamine, In particular amorphous polyamides can be used as further component C, which are obtained by polycondensation of diamines, such as ethylenediamine, hexamethylenediamine, decamethylenediamine, 2,2,4- and/or 2,4,4-trimethylhexamethylenediamine, m- and/or p-xylylenediamine, bis-(4-aminocyclohexyl)-methane, bis-(4-aminocyclohexyl)-propane, 3,3'-dimethyl-4,4'-diamino-dicyclohexylmethane, 3-aminomethyl-3,5,5-trimethyl-cyclohexylamine, 2,5- and/or 2,6-bis-(aminomethyl)-norbornane and/or 1,4-diaminomethylcyclohexane, with dicarboxylic acids such as oxalic acid, adipic acid, azelaic acid, azelaic acid, decanedicarboxylic acid, heptadecanedicarboxylic acid, 2,2,4- and/or 2,4,4-trimethyladipic acid, isophthalic acid and terephthalic acid.

Preferably, the polyamides suitable as component C have a relative viscosity (measured on a 1 wt. % solution in m-cresol or 1% (weight/volume) solution in 96 wt. % sulfuric acid at 25° C.) of from 2.0 to 5.0, particularly preferably from 2.5 to 4.0.

Furthermore, the thermoplastic moulding composition may comprise one or more graft copolymers, e.g. ASA graft copolymers, which are not prepared according to the inventive process, wherein for example the volume concentration of surfactant S2 is not within the claimed range. Typically, the thermoplastic moulding composition may comprise such other ASA graft copolymers in an amount of 5 to 50% by weight, preferably 10 to 30% by weight, more preferably 10 to 20% by weight, based on the total moulding composition.

Further Additive K

The thermoplastic moulding composition can optionally comprise 0 to 40% by weight, preferably 0 to 10% by weight, also preferably 0.01 to 40% by weight, more preferably 0.01 to 10% by weight, also preferably 0.1 to 5% by weight, based on the total moulding composition, at least one further additive K.

The optional further component K may be selected from commonly known additives and/or auxiliaries for plastic materials. With respect to conventional auxiliaries and additives, reference is made by way of example to "Plastics Additives Handbook", Ed. Gächter and Müller, 4th edition, Hanser Publ., Munich, 1996. For example the at least one further component K may be selected from fillers, reinforcing agents, colorants, pigments, lubricants or mould-release agents, stabilizers, in particular light and heat stabilizers, antioxidants, UV absorbers (such HALS stabilizers), plasticizers, impact modifiers, antistatic agents (for example block copolymers made from ethylene oxidepropylene oxide, e.g. products Pluronics® of BASF SE), flame retardants, bactericides, fungicides, optical brighteners, and blowing agents.

The optional at least one further component K is preferably selected from colorants, pigments, lubricants or mould-release agents, stabilizers, in particular light stabilizers, antistatic agents, flame retardants and fillers, in particular mineral fillers. In a preferred embodiment the thermoplastic composition comprises 0.01 to 10% by weight, also preferably 0.1 to 5% by weight, based on the total moulding composition, at least one further additive K selected from colorants, pigments, lubricants or mould-release agents, stabilizers, antistatic agents, flame retardants and fillers.

Furthermore, the thermoplastic composition may comprise as further component K residues of the surfactant S, initiators, buffers etc. used for production of graft copolymer B as described below.

In particular the thermoplastic moulding composition can optionally comprise 0 to 10% by weight, preferably 0.1 to 10% by weight, pigments and/or colorants. Pigments and colorants for graft copolymer rubber compositions, in particular ASA compositions, are known commonly, for example the pigment and/or colorants can be selected from titanium dioxide, phthalocyanines, ultramarine blue, iron oxides, or carbon black, and also the entire class of organic pigments.

In particular the thermoplastic moulding composition can optionally comprise 0 to 3.5% by weight, preferably 0.01 to 3.5% by weight, typical stabilizers, in particular UV stabilizers. Common stabilizers for thermoplastic polymers encompass stabilizers for improving thermal stability, which are commonly agents to counteract thermal decomposition, light stabilizers (stabilizers for increasing lightfastness), and stabilizers for raising resistance to hydrolysis and to chemicals. Examples of suitable light stabilizers are various substituted resorcinols, salicylates, benzotriazoles, and benzophenones. Examples of suitable stabilizers are hindered phenols, but also vitamin E and compounds whose structure is analogous thereto. The use of HALS stabilizers (Hindered Amine Light Stabilizers), benzophenones, resorcinols, salicylates, and benzotriazoles is also suitable.

Examples that may be mentioned of fillers, which may be selected from particulate fillers or reinforcing agents, are silicates, amorphous silica, calcium silicates, such as wollastonite, powdered quartz, mica, metal oxides, metal hydroxides, carbon black, graphite, barium sulfate, calcium carbonate, magnesium carbonate, bentonites, talc, kaolin, carbon fibres or glass fibres in the form of glass woven, glass mats, or glass silk rovings, chopped glass, or glass beads. In particular at least one particulate filler (preferably at least one mineral filler) can be used as further component K.

Examples of suitable antistatic agents are amine derivatives, such as N,N-bis(hydroxyalkyl)alkylamines or -alkyleneamines, alkylsulfonates, polyethylene glycol esters, copolymers composed of ethylene oxide glycol and of propylene oxide, glycol, and glycerol mono- and distearates, and also mixtures of these.

Suitable lubricants or mould-release agents are fatty acids having from 12 to 30 carbon atoms, salts and derivatives thereof, for example stearic acid and stearates, stearyl alcohol, stearic esters, amide waxes (e.g. stearamides, in particular ethylene bis(stearamide) (EBS)), and polyolefin waxes. Particularly suitable lubricants and mould-release agents are stearic acid, stearates (e.g. magnesium stearate), ethylene bis(stearamide) (e.g. Irgawax®, Ciba, Switzerland) and mixtures thereof. Preferably the thermoplastic moulding composition comprises 0.05 to 5% by weight, preferably 0.1 to 3% by weight, based on the total thermoplastic moulding composition, at least one lubricant or mould-release agents, more preferably ethylene bis(stearamide) and/or magnesium stearate.

In particular the thermoplastic moulding composition can optionally comprise 0 to 2% by weight, preferably 0.01 to 2% by weight, at least one common processing aid, e.g. selected from lubricant and mould release agents and antistatic agents.

Emulsion Polymerization Steps a) and b)

The preparation of graft copolymer B latex in steps a) and b) according to the invention is conducted via emulsion polymerization. Common embodiments of emulsion polymerization, in batch or continuous mode, are well known to a skilled person.

The inventive process encompasses the preparation of the at least one graft base B1 via emulsion polymerization of monomers B11, B12 and optional B13, preferably of monomers B11 and B12, wherein at least one surfactant S1 is added (step a). The preferred embodiments of monomers B11, B12 and B13 as well as graft base B1 are described above.

Before and/or during the emulsion polymerization in step a) additives as described below, such as surfactants, pH buffers, initiators and molecular weight regulator, can be added. Preferably the at least one surfactant S1 is selected from one or more surfactant S as described below.

Typically the at least one surfactant S1 is added in step a) in an amount from 0.1 to 5% by weight, preferably 0.2 to 3% by weight, particularly preferably from 0.4 to 2% by weight, based on the total amount of monomers B11, B12, and B13 used in preparation of the graft base B1 (step a).

Typically the emulsion polymerization of the at least one graft base B1 (step a) is carried out at a temperature in the range of 20 to 90° C., preferably 30 to 80° C., more preferably 50 to 70° C. Typically the monomers B11, B12 and optionally B13 are added at once, continuously or stepwise to the aqueous reaction medium, which preferably contains the at least one surfactant S1 and at least one initiator and optionally a buffer. Preferably the total amount of monomer B11, B12 and/or optionally B13 are added continuously or stepwise within a period of 10 min to 4 h, preferably 1 to 3 h. Preferably the emulsion polymerization in step a) is continued afterwards for a period of 10 to 120 min, preferably 30 to 100 min.

Typically the solid content of the graft base B1 latex obtained in step a) is in the range of 15 to 40% by weight, preferably 35 to 45% by weight. Typically the solid content (e.g. of the latex of graft base B1 or of the latex of graft copolymer B) refers to and is equal to the weight content of the non-volatile compounds in the composition (e.g. in the latex of graft base B1 or in the latex of graft copolymer B). The solid content is in particular equal to the solid content determined gravimetrically by removing the volatile compounds (in particular water), for example by evaporation at 150 to 180° C. for about 10 to 120 min in a drying cabinet.

Preferably, the mean particle diameter $D_w$ of graft base B1 latex obtained in step a) is in the range of 50 to 800 nm, preferably 60 to 600 nm, more preferably 60 to 200 nm, in particular preferably 60 to 150 nm, also preferably 200 to 800 nm, more preferably 300 to 500 nm. It is also possible to use a graft base B1 having a mean particle diameter $D_w$ in the range of 50 to 200 nm, preferably 60 to 100 nm, obtained as described above as an seed latex and polymerize further monomers B11 and B12 in the presence of said seed latex. In this embodiment the graft base B1 obtained in step a) preferably has a mean particle diameter $D_w$ in the range of 200 to 800 nm, preferably 300 to 600 nm, more preferably 350 to 550 nm.

The inventive process encompasses the preparation of the at least one graft copolymer B via emulsion polymerization of the at least one monomer B21 and optional B22 in the presence of the at least one graft base B1, wherein at least one surfactant S2 is added (step b). The preferred embodiments of monomers B21 and B22 as well as graft copolymer B are described above.

According to the inventive process the graft copolymer B is obtained in step b) in form of a latex having a mean particle diameter $D_w$ in the range of 60 to 800 nm, preferably 60 to 600 nm, more preferably 60 to 200 nm, in particular preferably 70 to 180 nm, also preferably 300 to 800 nm.

The particle size of latex particles can be governed during synthesis by suitable means known in the literature, e.g. DE-A 28 26 925.

Typically, particle size distribution, the weight mean average particle diameter $D_w$ and the median particle size $D_{50}$ value can be determined using a ultracentrifuge (for example as described in W. Scholtan, H. Lange: Kolloid Z. u. Z. Polymere 250, pp. 782 to 796 (1972)) or a disc centrifuge (for example DC 24000 by CPS Instruments Inc.). The median particle diameter $D_{50}$ represents the value of the particle size distribution curve where 50 Vol.-% of the particles (e.g. polyacrylate latex particles) have diameter smaller than the $D_{50}$ value and the other 50 Vol.-% have diameter larger than the $D_{50}$ value. In similar way for example the $D_{90}$ values gives the particle diameter, where 90 Vol.-% of all particles have a smaller diameter.

The weight mean average particle diameter $D_w$ (or De Broucker mean particle diameter), also referred to as mean particle diameter $D_w$, is an average size based on unit weight of particle. For example the weight mean average particle size diameter $D_w$ can be given as:

$$D_w = \text{sum}(n_i * D_i^4) / \text{sum}(n_i * D_i^3)$$

with $n_i$: number of particles with the diameter $D_i$
(e.g. G. Lagaly, O. Schulz, R. Ziemehl: Dispersionen und Emulsionen: Eine Einführung in die Kolloidik feinverteilter Stoffe einschließlich der Tonminerale, Darmstadt: Steinkopf-Verlag 1997, ISBN 3-7985-1087-3, page 282, formula 8.3b). The summation is normally performed from the smallest to largest diameter of the particles size distribution. It should be mentioned that for a particles size distribution of particles with the same density the volume mean average particle size diameter is equal to the weight mean average particle size diameter.

Preferably, the weight mean average particle diameter $D_w$ can be determined by turbidity measurement as described in Lange, Kolloid-Zeitschrift und Zeitschrift für Polymere, volume 223, issue 1.

According to the inventive process the volume concentration of the total amount of surfactant S2 (used in all graft emulsion polymerization steps b)) is in the range of 0.46 to 0.75 mol/m³, preferably 0.5 to 0.7 mol/m³, more preferably 0.55 to 0.65 mol/m³, based on the volume of the graft copolymer B latex particles.

In case of two of more graft shells, e.g. two-stage graft copolymer B including graft B2' and B2", the volume concentration of surfactant S2 added in all graft emulsion polymerization steps is within the range of 0.46 to 0.75 mol/m³, preferably 0.5 to 0.7 mol/m³, more preferably 0.55 to 0.65 mol/m³, based on the volume of the graft copolymer B latex particles.

Typically, the volume concentration $\vartheta$ in mol/m³ (referred to as $\vartheta$(theta) in the following) of surfactant S2 can be calculated according to the following formula:

$$\vartheta(\text{theta}) = \frac{1}{6} \cdot \frac{w(S2) \cdot \rho(B) \cdot 10^6}{M(S2)}$$

wherein
  $\vartheta$(theta) is the volume concentration of surfactant S2, given in mol/m³;
  w (S2) is the mass fraction of surfactant S2 in grafting step b) relative to solid content of graft copolymer B (i.e. w(S2)=m(S2)/m(B)),
  M (S2) is the molar mass of the surfactant S2, given in g/mol,
  $\rho$(B) is the density of graft copolymer B, given in in g/cm³.

Preferably, the addition of surfactant S2 in step b) can be carried out
  before or parallel to addition of monomers B11 and B12;
  after addition of monomers B11 and B12; and/or
  after graft emulsion polymerization is completed but before precipitation (step c)) of the graft copolymer latex.

In a preferred embodiment the at least one surfactant S2 is added before emulsion polymerization in step b) (graft emulsion polymerization), i.e. before addition of monomers B21 and B22, in an amount so that the volume concentration of the total amount of surfactant S2 is in the range of 0.46 to 0.75 mol/m³, based on the volume of the graft copolymer B latex particles obtained in step b).

In a preferred embodiment the at least one surfactant S2 is added after emulsion polymerization of the graft shell B2 (i.e. after graft emulsion polymerization) in step b), wherein the graft copolymer B comprises (preferably consists of):
  B1: 50 to 90% by weight, preferably 55 to 90% by weight, more preferably 55 to 65% by weight, based on the graft copolymer B, at least one graft base B1 as described above, and
  B2: 10 to 50% by weight, also preferably 10 to 45% by weight, more preferably 35 to 45% by weight, based on the graft copolymer B, exactly one graft shell B2, which is obtained by emulsion polymerization in the presence of the at least one graft base B1 of:
  B21: 70 to 80% by weight, based on the graft shell B2, at least one vinylaromatic monomer B21, wherein the monomer B21 is selected from styrene, $\alpha$(alpha)-methylstyrene and mixtures of styrene and one further monomer selected from $\alpha$(alpha)-methylstyrene, p-methylstyrene, $C_1$-$C_4$-alkyl(meth)acrylate (e.g. methyl(meth)acrylate, ethyl(meth)acrylate), preferably selected from styrene, $\alpha$(alpha)methylstyrene or mixtures of styrene and $\alpha$(alpha)-methylstyrene or methyl(meth)acrylate, and
  B22: 20 to 30% by weight, based on the graft shell B2, at least one ethylenically unsaturated monomer B22, wherein the monomer B22 is selected from acrylonitrile or mixtures of acrylonitrile and at least one further monomer selected from methacrylonitril, acrylamide, vinylmethylether, anhydrides of unsaturated carboxylic acids (e.g. maleic acid anhydride, phthalic acid anhydride) and imides of unsaturated carboxylic acids (e.g. N-substituted maleimide, like N-cyclohexylmaleimide and N-phenylmalimide), preferably selected from acrylonitrile or mixtures of acrylonitrile and methacrylonitrile;

wherein the total sum of graft base(s) B1 and graft shell(s) B2 is 100% by weight, and wherein the graft copolymer B is obtained in step b) in form of a latex having a mean particle diameter $D_w$ in the range of 60 to 200 nm.

In a particular preferred embodiment the surfactant S2 or the surfactants S2 and S1 are selected from arylalkyl sulfonates and alkyl sulfonates having an aliphatic linear or branched hydrocarbon chain of 5 to 30, preferably 8 to 30, preferably 10 to 18, carbon atoms, in particular sodium or potassium salts thereof, the precipitation solution comprises at least one magnesium salt, preferably magnesium sulfate, and the concentration of the surfactant S2 is selected so that the weight ratio of sulfur (S) to magnesium (Mg), referred to as w(S): w(Mg), in the thermoplastic moulding composition obtained in the inventive process, is below 2.6, preferably in the range of 1 to 2.5, more preferably in the range of 1.5 to 2.5.

Typically, the emulsion polymerization of the at least one graft copolymer B (step b) is carried out at a temperature in the range of 20 to 90° C., preferably 30 to 80° C., more preferably 50 to 70° C. Typically the monomer B21 and optionally B22 are added at once, continuously or stepwise to the aqueous reaction medium, which contains the at least one graft base B1 and preferably the at least one surfactant S2 and at least one initiator and optionally a buffer. Preferably the total amount of monomer B21 and optionally B22 and/or B13 are continuously or stepwise within a period of 10 min to 4 hours, preferably 1 to 3 hours. Preferably, the emulsion polymerization in step b) is continued after addition of monomers for a period of 10 to 120 min, preferably 30 to 100 min.

Typically the solid content of the graft copolymer B latex obtained in step b) is in the range of 15 to 40% by weight, preferably 35 to 45% by weight. Typically the solid content is determined as described above.

Typically, the graft emulsion polymerization for preparing the at least one graft shell B2 (for example B2' and B2") (step b)) is conveniently carried out in the same vessel like the emulsion polymerization for preparing the at least one graft base B1 (step a)).

Before and/or during the emulsion polymerization steps a) and b) additives, such as surfactants S1 and S2, pH buffers and initiators can be added.

Suitable surfactants, buffers and initiators are described in WO 2015/150223 and WO 2015/078751.

In addition a molecular weight regulator can be used for preparation of the at least one graft base B1 and/or for preparation of at least one graft copolymer B. Preferably a molecular weight regulator is used in an amount of 0.01 to 2% by weight, more preferably from 0.05 to 1% by weight, based on the total amount of monomers used for emulsion polymerization. Suitable molecular weight regulators are for example alkyl mercaptans, like n-dodecylmercaptan, t-dodecylmercaptan; dimeric α(alpha)methylstyrene and terpinolenes.

Suitable initiators for producing graft base B1 and/or for emulsion polymerization of at least one graft copolymer B are arbitrary initiators commonly known to a skilled person. Preferably at least one organic and/or inorganic peroxide compounds (comprising at least one peroxide group R—O—O—H and/or R—O—O—R) is used as initiator.

Especially inorganic peroxide salts, like persulfate, perphosphate or perborate, of aluminium, sodium or potassium can be used. More preferred are sodium and potassium persulfates.

In a preferred embodiment of the invention an inorganic peroxide salt, preferably inorganic persulfate salt, preferably sodium persulfate and/or potassium persulfate, is used as initiator for emulsion polymerization of graft copolymer B.

Typically, the at least one initiator is added during emulsion polymerization in step a) and/or b) in an amount of 0.01 to 1% by weight, preferably 0.05 to 0.5% by weight, more preferably 0.1 to 0.2% by weight, based on the total amount of monomers used in the respective emulsion polymerization step (step a) and/or b)).

In a preferred embodiment the preparation of the graft base B1 via emulsion polymerization in step a) and/or the preparation of the graft copolymer B via emulsion polymerization in step b) is carried out under addition of at least one persulfate as initiator, wherein the initiator is added in step a) and/or b) in an amount of 0.01 to 1% by weight, preferably 0.05 to 0.5% by weight, more preferably 0.1 to 0.35% by weight, based on the total amount of monomers used in the respective emulsion polymerization step.

Typically a suitable buffer is used for producing graft copolymer B, e.g. sodium carbonate or sodium bicarbonate.

In a preferred embodiment the monomers, especially monomers B21 and B22 of the at least one graft shell B2, can be added to the reaction mixture at once or in a continuous way or step-wise in several steps, preferably in a continuous way, during polymerization. When monomers B21 and/or B22 are added in several steps (wherein the steps differ in selection of monomers, amounts of monomers and/or ratio of monomers) typically a multi layered graft shell B2 is obtained. Especially for preparation of the at least one graft shell B2 the monomers B21 and B22 are added separately or in form of a monomer mixture continuously to the at least one graft base B1, in the right amounts and ratios. Typically the monomers in both steps a) and b) are added in a way known to a skilled person.

Generally, temperature during emulsion polymerization of graft copolymer B (steps a) and b)) is from 25 to 160° C., preferably 40 to 90° C. Typically, temperature management can be applied during reaction, like an isothermal process. Preferably the polymerization is conducted in a way to keep the temperature difference between start and end of the reaction less than 20° C., preferably less than 15° C., and more preferably less than 5° C.

Preferably, the at least one graft copolymer B latex obtained after step b) comprises less than 0.1% by weight, preferably less than 0.08% by weight, based on the total solid content of the graft copolymer B, of coagulated latex particles (coagulum).

Surfactant S

In terms of the present invention a surfactant is a compound reducing the surface tension of the aqueous phase. Generally a surfactant and/or a protective colloids help to stabilize a dispersion, in particular a suspension, an emulsion or a suspoemulsion against sedimentation. The surface active agents used as surfactants S (in particular S1 and S2) are preferably compounds, which have molecular weights below 5,000 g/mol, preferably below 2,000 g/mol. They may be anionic, cationic, or non-ionic in nature. Preferably ionic compounds, more preferably anionic compounds, commonly known as surfactants are used as surfactant S.

The at least one surfactant S, in particular surfactant S1 and/or S2, is preferably used in an amount from 0.1 to 5% by weight, preferably 0.2 to 3% by weight, particularly preferably from 0.4 to 2% by weight, based on the total amount of monomers used in the respective emulsion polymerization step (step a) or step b)).

Typically the surfactant S1 and S2 can be selected independently from each other, preferably from the surfactants described in the following. More preferably the surfactants S1 and S2 added in step a) and b) are the same surfactant.

In a preferred embodiment, surfactant S1 used for emulsion polymerization of the at least one graft base B1 and/or surfactant S2 used for graft emulsion polymerization of the at least one graft copolymer B are selected from anionic surfactants. Preferably surfactant S1 and/or S2 are selected from alkyl sulfonic acids, arylalkyl sulfonic acids, alkyl sulfates, alkyl sulfonates, aryl alkyl sulfonates, fatty acids, soaps of saturated or unsaturated fatty acids as well as alkaline disproportionated or hydrated abietic acid or tall oil acids or mixtures thereof. Preferably surfactants S1 and/or S2 comprising carboxylic groups are used, e.g. salts of $C_{10}$-$C_{18}$ fatty acids, disproportionated abietic acid or tall oil acids, surfactants according to DE-OS 36 39 904 and DE-OS 39 13 509.

Examples of suitable surfactants S1 and S2 are ethoxylated mono-, di-, and trialkylphenols having from 4 to 9 carbon atoms in the alkyl radical and an degree of ethoxylation (EO index) from 3 to 50, ethoxylated fatty alcohols having from 8 to 36 carbon atoms in the alkyl radical and an EO index from 3 to 50, fatty alcohol sulfonates, sulfosuccinates, ether sulfonates, resin soaps, and also the alkali metal or ammonium salts of alkylsulfonates having from 8 to 12 carbon atoms in the alkyl radical, and salts of higher fatty acids having from 10 to 30 carbon atoms in the alkyl radical. Other suitable surfactants are found in Houben-Weyl, Methoden der organischen Chemie, Vol. XIV/1, Makromolekulare Stoffe, Georg-Thieme-Verlag, Stuttgart, 1961, pp. 192-206.

Other suitable anionic surfactants S are bis(phenylsulfonic acid) ethers and their alkali metal or ammonium salts, wherein these bear a $C_4$-$C_{24}$-alkyl group on one or both aromatic rings. These compounds are described for example in U.S. Pat. No. 4,269,749.

In a preferred embodiment the at least one surfactant S1 and/or S2 are one or more anionic surfactants, selected from alkyl sulfonic acids, arylalkyl sulfonic acids (in particular alkylbenzene sulfonic acids, such as dodecylbenzenesulfonic acid), fatty acids and salts thereof, preferably sodium or potassium salts thereof, having an aliphatic linear or branched hydrocarbon chain of 5 to 30, preferably 8 to 30, preferably 10 to 18, carbon atoms. Preferably the at least one surfactant S1 and/or S2 are one or more compounds selected from sodium or potassium salts of arylalkylsulfonates, alkyl sulfonates and fatty acids having from 10 to 18 carbon atoms.

The at least on surfactants S1 and/or S2 can be selected from fatty acids, in particular fatty acids having an aliphatic hydrocarbon chain of 10 to 30, preferably 10 to 18, carbon atoms and sodium and potassium salts thereof. More preferably the surfactant C is at least one fatty acid selected from oleic acid, stearic acid, palmitic acid and sodium and potassium salts thereof.

In an preferred embodiment the at least on surfactants S1 and/or S2 are selected from alkylsulfonic acids R—S(=O)$_2$—OH and salts thereof, preferably sodium and potassium salts, in particular selected from alkylsulfonic acids and salts thereof having an aliphatic linear or branched hydrocarbon chain R of 5 to 30, preferably 8 to 30, preferably 10 to 18, carbon atoms. For example the at least on surfactants S1 and/or S2 can be selected from paraffin sulfonic acid and dodecyl sulfonic acid.

In a preferred embodiment the surfactant S2 or the surfactants S2 and S1 are selected from arylalkyl sulfonates and alkyl sulfonates having an aliphatic linear or branched hydrocarbon chain of 5 to 30, preferably 8 to 30, preferably 10 to 18, carbon atoms, in particular sodium or potassium salts thereof.

In another preferred embodiment, the at least on surfactants S1 and/or S2 or the active form of the surfactant S1 and/or S2 is prepared in situ from an alkylsulfonate, arylalkyl-sulfonate or a fatty acid with an alkali metal hydroxide by conversion into the corresponding salt, which is active as surfactant in the dispersion. Instead of alkali metal hydroxides, it is also possible to use alkali metal carbonates or alkali metal hydrogen carbonates. Preferably the at least one surfactant S is at least one fatty acid, preferably selected from oleic acid, stearic acid and palmitic acid, which is converted into the corresponding sodium or potassium salt.

Precipitation Step c)

The inventive process for producing a thermoplastic moulding composition encompasses step c) the precipitation of the graft copolymer B by mixing the graft copolymer B latex obtained in step b) with a precipitation solution comprising at least one salt and/or acid. Typically the graft copolymer B latex obtained in step c) is precipitated using a precipitation solution comprising at least one salt or at least one salt and at least one acid. Preferred salts are selected from magnesium sulfate, calcium chloride; magnesium sulfate monohydrate (kieserite Mg[SO$_4$].H$_2$O), magnesium sulfate pentahydrate (pentahydrate Mg[SO$_4$].5H$_2$O), magnesium sulfate hexahydrate (hexahydrite Mg[SO$_4$].6H$_2$O) and magnesium sulfate heptahydrate (epsomite, Mg[SO$_4$].7H$_2$O). Preferred acids are selected from sulfuric acid, phosphoric acid, and acetic acid.

In a particular preferred embodiment the precipitation solution comprises at least one magnesium salt, preferably magnesium sulfate. For example the precipitation solution can be prepared using anhydrous magnesium sulfate, magnesium sulfate monohydrate (kieserite Mg[SO$_4$].H$_2$O), magnesium sulfate pentahydrate (pentahydrate Mg[SO$_4$].5H$_2$O), magnesium sulfate hexahydrate (hexahydrite Mg[SO$_4$].6H$_2$O).

Typically, the precipitation solution used in the inventive process is prepared by mixing water with at least one salt or an saturated solution of the salt and/or at least one acid. Typically the precipitation solution comprises 0.1 to 5% by weight, preferably 0.2 to 1% by weight of the at least one salt and/or at least one acid.

For example the precipitation solution is firstly provided, e.g. in a precipitation tank, following the graft copolymer B is added into the precipitation solution under stirring, and afterwards optionally the obtained precipitation mixture is heated up. Typically the precipitation in step c) is carried out at temperatures in the range of 40° C. to 150° C., preferably 60 to 95° C.

Preferably the total solid content of the graft copolymer B latex used in step c) is in the range of 5 to 45% by weight, preferably 10 to 40% by weight, more preferably 15 to 40% by weight.

In particular details of a precipitation step suitable in the inventive process are describes for example in WO 2017/211783 or in WO 2018/060111 (pages 24-25 and 38-39).

Dewatering Step d)

The inventive process for producing a thermoplastic moulding composition encompasses step d), wherein the precipitated graft copolymer B obtained in step c) is mechanically dewatered, optional washed and/or optional dried.

Typically, the precipitated graft copolymer B is at least partially dewatered in particular by centrifugation and/or filtration. Preferably the precipitated graft copolymer B is at least partially mechanically dewatered and separated from the aqueous phase using a centrifuge.

Typically the graft copolymer B obtained after mechanical dewatering in step d) has a residual moisture level in the range of 10 to 50% by weight, preferably 20 to 40% by weight, more preferably 25 to 35% by weight, based on the graft copolymer B.

The residual moisture level refers to the amount of water given in % by weight, based on the total wet graft copolymer B. Typically the residual moisture level can be determined using suitable apparatus, such as a drying scales. Typically the sample is dried over a given period as long as a constant weight level is maintained. For example the residual moisture level can be determined in Halogen Moisture Analyzer HR73 from Mettler-Toledo, at 180° C., maintaining a constant weight for 30 seconds.

In a further preferred embodiment the graft copolymer B is washed once or several times after mechanical dewatering wherein the separated graft copolymer B is brought in contact with water or a mixture of water and a polar organic solvent miscible with water (optional washing step). After washing the graft copolymer B is typically separated from the water, e.g. by centrifugation.

Optional the dewatered or dewatered and washed graft copolymer B may be dried, for example using a cabinet dryer or other common known drying apparatus, such as flash dryer or fluidized bed dryer. The graft copolymer B can also be dried as described in DE-A 19907136. Typically the optional drying step is carried out at a temperature in the range of 50 to 160° C.

Preferably, the graft copolymer B obtained in step d) is in form of a dried polymer latex powder having a residual moisture level of less than 5% by weight, preferably less than 2% by weight, more preferably less than 1% by weight after.

It is also suitable to mix graft copolymer B in step e) in the form of moist crumb (without dying step) having a residual moisture level of from 1 to 40% by weight, in particular from 20 to 40% by weight, whereupon then the complete drying of the graft copolymers takes place during the mixing process (step e). For example, the graft copolymer B can be dried as described in EP-A 0 735 077, wherein the precipitated and dewatered graft copolymer B is directly extruded including addition of component A and optional the components C and/or K and wherein residual water of dewatered graft copolymer is removed from the completely as vapor or partly as vapor and partly in liquid form.

Mixing Step e)

The inventive process for producing a thermoplastic moulding composition encompasses the step e), wherein the graft copolymer B (in particular the dried graft copolymer powder) obtained in step d) is mixed with the at least thermoplastic copolymer A, and optional with further components C and/or K, wherein the mixing may be carried out successively or simultaneously.

Methods and devices for mixing the graft copolymer B with other polymers and/or other components selected from additives and auxiliaries as mentioned above are known by a skilled person. Typically step e) encompasses melt-compounding and/or melt-extrusion and can be carried out using one or more kneaders, extruders and/or twin shaft screw.

Preferably the mixing in step e), in particular the mixing of the dried graft copolymer B, the thermoplastic copolymer A and optional further components K, is carried out at temperatures in the range of 200 to 300° C.

In particular details of the mixing step suitable in the inventive process are describes in WO 2017/211783 or in WO 2018/060111 (pages 31 and 41).

In a preferred embodiment the thermoplastic moulding composition obtained by the inventive process exhibits a specific surface resistivity, determined according to IEC 62631-3-2:2015, in the range of $6.4*10^{14}$ to $9.14*10^{14}$ Ohm, preferably in the range of $7*10^{14}$ to $9*10^{14}$ Ohm, more preferably in the range of $7.5*10^{14}$ to $8.5*10^{14}$ Ohm.

The inventive thermoplastic compositions can be used to produce formed parts by any commonly known method, e.g. injection moulding, extrusion, blow moulding. For example the formed parts can be selected from plates, semi-manufactured products, films, fibres and foams. In particular said moulded parts can for example used in the automobile sector, e.g. in bodywork construction for vehicles, for the interior of automobiles. The mouldings of the invention can be employed, in particular, in the construction of ships, aircraft or trains, in particular as lining parts, undertray components, dashboards, shell construction for seats, bulkheads. Furthermore, nonautomotive applications of the mouldings of the invention are also conceivable, e.g. formwork plates, lining elements, supporting shells and casing components.

The present invention is further illustrated by the following examples and claims.

EXPERIMENTAL EXAMPLES

1. Preparation of Graft Copolymer B

The polybutylacrylate basic latex (graft base B1) as used in the following examples 1.1 to 1.3 were produced using the same recipe (see example 1.1) having a particle diameter $D_w$ of about 75 nm. A mixture of primary and secondary sodium $C_{12}$-$C_{18}$ alkyl sulfonates with an average chain length of $C_{15}$ and a mean molecular weight of M=288.84 g/mol is used as surfactant S1 (preparing graft base B1) and as surfactant S2 (grafting step). The volume concentration (determined according to example 3.3) of the surfactant S2 added during the graft stage, i.e. emulsion polymerization of the monomers B21 and B22, was varied. The amount of coagulum in the graft copolymer B latices was determined as described in example 3.2. The amounts and results are summarized in Table 1.

1.1 Component B-1

In a first step a polybutylacrylate basic latex (graft base B1) was prepared as described in the following:

The reaction vessel was charged with 86.12 parts by weight of demineralized water, 0.61 parts by weight of the surfactant S1 (sodium salt of $C_{12}$-$C_{18}$-paraffin sulfonic acid, M=288.84 g/mol) and 0.23 parts by weight sodium bicarbonate. When the temperature in the reaction vessel had reached 59° C., 0.18 parts by weight of potassium persulfate, dissolved in 5 parts by weight of demineralized water, were added. A mixture of 59.51 parts by weight butyl acrylate (monomer B11) and 1.21 parts by weight tricyclodecenylacrylate (dihydrodicyclopentadienylacrylate, DCPA) (monomer B12) were added within a period of 210 min. Afterwards the reaction was continued for 60 min. Finally the polymer dispersion had a total solid content of 39.6% and the latex particles had a mean particle diameter $D_w$ of 75 nm. The particle size was determined by turbidity as described in example 3.1.

Afterwards, graft shell B2 was obtained by emulsion polymerization of styrene and acrylonitrile in the presence of the polybutylacrylate basic rubber latex (graft base B1). An amount of 152.87 parts by weight of the basic latex described above was added to the reaction vessel together with 90.37 parts by weight of demineralized water, 0.11 parts by weight of the surfactant S2 (sodium salt of $C_{12}$-$C_{18}$-paraffin sulfonic acid) and 0.16 parts by weight of potassium persulfate, dissolved in 5.22 parts by weight of demineralized water.

Within a period of 190 min a mixture of 77% by weight styrene and 23% by weight acrylonitrile was added, wherein in a first step 6.49 parts styrene and 1.94 parts acrylonitrile are added within 20 mins, followed by 20 min waiting time, afterwards 24.69 parts styrene and 7.37 parts acrylonitrile are added within 150 mins. The monomer addition takes place at a temperature of 61° C., followed by a post polymerization time of 60 min at 65° C. A polymer dispersion (component B-1) with a total solid content of 39.5% was obtained. The latex particles had a mean particle diameter $D_w$ of 87 nm (determined by turbidity). Coagulum was determined as described in example 3.2 to be 0.058% by weight, based on the total solid content of the graft copolymer latex B.

1.2 Component B-2 (Comparative Example)

An amount of 152.87 parts by weight of the polybutylacrylate basic rubber latex (graft base B1) as described in example 1.1 was added to the reaction vessel together with 90.37 parts by weight of demineralized water, 0.08 parts by weight of the surfactant S2 and 0.16 parts by weight of potassium persulfate, dissolved in 5.22 parts by weight of demineralized water.

Within a period of 190 min a mixture of 77% by weight styrene and 23% by weight acrylonitrile was added, wherein in a first step 6.49 parts styrene and 1.94 parts acrylonitrile are added within 20 mins, followed by 20 min waiting time, afterwards 24.69 parts styrene and 7.37 parts acrylonitrile are added within 150 mins. The monomer addition takes place at a temperature of 61° C., followed by a post polymerization time of 60 min at 65° C. A polymer dispersion (component B-2) with a total solid content of 39.5% by weight is obtained. The latex particles had a mean particle diameter $D_w$ of 91 nm determined by turbidity as described in example 3.1. Coagulum was determined as described in example 3.2 to be 0.128% by weight, based on the total solid content of the graft copolymer latex B.

1.3 Component B-3 (Comparative Example)

An amount of 152.87 parts by weight of the polybutylacrylate basic rubber latex (graft base B1) as described in example 1.1 was added to the reaction vessel together with 90.37 parts by weight of demineralized water, 0.12 parts by weight of the sodium salt of $C_{12}$-$C_{18}$ paraffin sulfonic acid (M=288.84 g/mol) and 0.16 parts by weight of potassium persulfate, dissolved in 5.22 parts by weight of demineralized water.

Within a period of 190 min a mixture of 77% by weight styrene and 23% by weight acrylonitrile was added, wherein in a first step 6.49 parts styrene and 1.94 parts acrylonitrile are added within 20 mins, followed by 20 min waiting time, afterwards 24.69 parts styrene and 7.37 parts acrylonitrile are added within 150 mins. The monomer addition takes place at a temperature of 61° C., followed by a post polymerization time of 60 min at 65° C. A polymer dispersion (component B-3) with a total solid content of 39.5% by weight was obtained. The latex particles had a mean particle diameter $D_w$ of 91 nm determined by turbidity as described in example 3.1. Coagulum was determined as described in example 3.2 to be 0.106% by weight, based on the total solid content of the graft copolymer latex B.

TABLE 1

ASA graft copolymer latices

| | Unit | Ex.-1.1 (Inventive) | Ex.-1.2 (Comparative) | Ex.-1.3 (Comparative) |
|---|---|---|---|---|
| Graft copolymer | | B-1 | B-2 | B-3 |
| Volume conc. S2 (θ) | mol/m³ | 0.69 | 0.47 | 0.76 |
| Coagulum | % by weight | 0.058 | 0.128 | 0.106 |

It was surprisingly found that for volume concentration of the sodium alkyl sulfonate (surfactant S2) of more than 0.43 mol/m³ as well as for volume concentration of less than 0.69 mol/m³ very low amounts of coagulum is observed after the preparation of graft copolymer latex. Approximately twice of the coagulum amount is found in comparative examples Ex.-II (relating to B-2) and Ex.-III (relating to B-3). The lower amount of coagulum reduces the cleaning effort in the plant significantly.

1.4 Precipitation Step

Each of the graft copolymer latices B obtained in examples 1.1 to 1.3 were separately coagulated in a magnesium sulfate solution. Each of the graft copolymer latices B obtained in examples 1.1 to 1.3 was dosed in a stirred tank together with a magnesium sulfate solution (18% by weight) at a temperature of about 88° C. The concentration of magnesium sulfate, based on the total aqueous phase in the tank was about 0,8% by weight and the concentration of the graft copolymers (B-1, B-2 or B-3), calculated as solid and based on the total content of components in the tank, was about 18% by weight.

Each of the precipitated graft copolymers B-1, B-2 or B-3 was filtered off, washed twice with 21 l of water, and dried in an lab oven (2 days, 60-70° C.) afterwards. The graft copolymer components (graft copolymer powder) B-1, B-2 and B-3 having a water content of <1% by weight were obtained.

2. Preparation of Thermoplastic Moulding Compositions 2.1 Each of the graft copolymer components B-1, B-2 and B-3 (graft copolymer powders) obtained in example 1 were mixed with component
A-1: Luran VLP (styrene acrylonitrile copolymer with 35% by weight acrylonitrile and viscosity number VN of 80 ml/g (determined according to DIN 53726 at 25° C., 0.5% by weight in dimethylformamide), to obtain a thermoplastic moulding composition. A Coperion ZSK 25 extruder was used for melt compounding of the components A and B, wherein the mass temperature was in the range of 220 to 250° C. The amounts of components B-1/B-2/B-3 and A-1 are given in table 2 below.

2.2 Test pieces of the thermoplastic moulding compositions used for mechanical testing and other test methods were obtained by injection moulding using an Arburg machine under standard conditions, i.e. 250° C. to 270° C. melt temperature, 70° C. tool temperature.

2.3 The compositions and test results (determined according to examples 3.4 to 3.6) are summarized in the following table 2:

TABLE 2

Thermoplastic moulding composition and test result

| | | Ex.-2.1a (Inventive) | Ex.-2.1b (Comparative) | Ex.-2.1c (Comparative) |
|---|---|---|---|---|
| A-1 | % by weight | 50 | 50 | 50 |
| B-1 | % by weight | 50 | — | — |
| B-2 | % by weight | — | 50 | — |
| B-3 | % by weight | — | — | 50 |
| $a_k$ notched Charpy impact strength | kJ/m² | 47.5 | 38.4 | 38.7 |
| Spec. surface resistivity | Ohm | $8.05*10^{14}$ | $9.15*10^{14}$ | $6.39*10^{14}$ |
| weight ratio w(S)/w (Mg) | | 2.1 | 2.8 | 2.6 |

It was found that the graft rubber copolymer B-1, produced according to the invention and compounded into SAN matrix (component A-1), yields a thermoplastic moulding composition showing higher notched Charpy impact strength compared to the graft rubber copolymers B-2 and B-3 (comparative examples).

Besides the specific range of volume concentration ϑ(theta) of surfactant S2 (see table 1), the specific surface resistivity of the thermoplastic moulding composition comprising components A and B and the mass ratio of sulfur to magnesium in the thermoplastic moulding compositions can be used as feature to differentiate the samples, i.e. to characterize the result of optimization of surfactant concentration. In line with this, inventive thermoplastic moulding compositions show a surface resistivity in the range of $6.4*10^{14}$ to $9.14*10^{14}$ Ohm and/or a mass ratio of sulfur to magnesium w (S)/w (Mg) below 2.6.

3. Test Methods 3.1 The mass mean particle diameter $D_w$ of the latex particles was determined by turbidity as described in Lange, Kolloid-Zeitschrift und Zeitschrift für Polymere, Vol. 223, issue 1.

3.2 The content of coagulum after graft emulsion polymerization was determined as follows: Coagulum was filtered off from the latex obtained after grafting monomers B21 (styrene) and B22 (acrylonitrile) using a metal sieve having a mesh size of 0.5 mm and/or collected from the reactor wall, thermometer and stirrer. The obtained coagulum was dried in a lab oven at 75° C. for 14 to 20 h and weighed.

The content of coagulum is given in % by weight, based on the total mass of graft copolymer B.

3.3 The volume concentration ϑ in [mol/m³] (referred to as theta) of surfactant S2, was calculated as follows:

$$\vartheta(\text{theta}) = \frac{1}{6} \cdot \frac{w(S2) \cdot \rho(B) \cdot 10^6}{M(S2)}$$

wherein
ϑ(theta) is the volume concentration of surfactant S2 in mol/m³
w (S2) is the mass fraction of surfactant S in grafting step relative to polymer B (i.e. w(S2)=m(S2)/m(B)),
M (S2) is the molar mass of the surfactant S in [g/mol], which is M=288.84 g/mol S2 used in the examples;
ρ(B) is the density of graft copolymer B in [g/cm³], which is ρ=1.087 g/cm³.

The density of graft copolymer B can be calculated based on the mass fraction w and the density ρ of the corresponding homopolymers, e.g. polybutylacrylate (ρ(PBAK)=1.087 g/cm³), polyacrylonitrile (ρ(PAN)=1.184 g/cm³), and polystyrene (ρ(PS)=1.05 g/cm³). For example the density ρ(B) of graft copolymer B can be calculated: ρ(B)=[w(PBAK)+w(PAN)+w(PS)]/[[w(PBAK)/ρ(PBAK)]+[w(PAN)/ρ(PAN)]+[w(PS)/ρ(PS)]]=[0.6+0.092+0.308]/[[0.6/1.087 g/cm³]+[0.092/1.184 g/cm³]+[0.308/1 0.05 g/cm³]]=1.087 g/cm³.

3.4 The Charpy notched impact strength was measured according to DIN 53 453 (ISO 179 1eA) using test pieces obtained by injection moulding according to example 2.2.

3.5 The specific surface resistivity (given in Ohm) was determined according to norm IEC 62631-3-2:2015 using test pieces obtained by injection moulding according to example 2.2.

3.6 The amounts of the elements sulfur (S) and magnesium (Mg) and following the weight ratio w(S)/w (Mg) were determined using inductively coupled plasma optical emission spectrometry (ICP-OES). Test pieces obtained according to example 2.2. were used for ICP-OES.

The invention claimed is:

1. A process for the preparation of a thermoplastic moulding composition comprising:
A: 5 to 95% by weight, based on the total moulding composition, at least one thermoplastic copolymer A, which comprises at least one vinylaromatic monomer A1 and optionally at least one further ethylenically unsaturated monomer A2;
B: 5 to 70% by weight, based on the total moulding composition, at least one graft copolymer B comprising:
B1: 50 to 90% by weight, based on the graft copolymer B, at least one graft base B1 obtained by emulsion polymerization of:
B11: 70 to 99.9% by weight, based on the graft base B1, at least one $C_1$-$C_8$ alkyl(meth)acrylate as monomer B11;
B12: 0.1 to 10% by weight, based on the graft base B1, at least one polyfunctional, cross-linking monomer B12; and
B13 0 to 29.9% by weight, based on the graft base B1, at least one further copolymerizable, mono-ethylenically unsaturated monomer B13 different from B11 and B12;
wherein the sum of B11, B12, and optional B13 is 100% by weight; and
B2: 10 to 50% by weight, based on the graft copolymer B, at least one graft shell B2, which is obtained by emulsion polymerization in the presence of the at least one graft base B1 of:
    B21 50 to 100% by weight, based on the graft shell B2, at least one vinylaromatic monomer B21; and
    B22 0 to 50% by weight, based on the graft shell B2, at least one ethylenically unsaturated monomer B22;
wherein the total sum of graft base B1 and graft shell B2 is 100% by weight;
C: 0 to 90% by weight, based on the total moulding composition, at least one further polymer component C; and
K: 0 to 40% by weight, based on the total moulding composition, at least one further additive K;
wherein the process encompasses the steps:
a) preparation of the at least one graft base B1 via emulsion polymerization of the monomers B11, B12, and optional B13, wherein at least one surfactant S1 is added;
b) preparation of the at least one graft copolymer B via emulsion polymerization of the at least one monomer B21 and optional B22 in the presence of the at least one graft base B1, wherein at least one surfactant S2 is added before, during, and/or after emulsion polymerization, wherein the graft copolymer B is obtained in form of a latex having a mean particle diameter $D_w$ in the range of 60 to 800 nm; and wherein the volume concentration of the total amount of surfactant S2 is in the range of 0.5 to 0.75 mol/m$^3$, based on the volume of the graft copolymer B latex particles;
c) precipitation of the graft copolymer B by mixing the graft copolymer latex obtained in step b) with a precipitation solution comprising at least one salt and/or acid;
d) mechanical dewatering, optional washing, and/or optional drying of the precipitated graft copolymer B obtained in step c); and
e) mixing of the precipitated graft copolymer B obtained in step d) with component A and optional the components C and/or K, wherein the thermoplastic moulding composition is obtained.

2. The process according to claim 1, wherein the at least one thermoplastic copolymer A comprises
   A1: 50 to 99% by weight, based on the copolymer A, of the at least one vinylaromatic monomer A1, selected from styrene, α-methylstyrene, or mixtures of styrene and at least one further monomer selected from α-methylstyrene, p-methylstyrene, and $C_1$-$C_8$ alkyl(meth)acrylate; and
   A2: 1 to 50% by weight, based on the copolymer A, of at least one further ethylenically unsaturated monomer A2, selected from acrylonitrile or mixtures of acrylonitrile and at least one further monomer selected from methacrylonitrile, acrylamide, vinylmethyl ether, anhydrides of unsaturated carboxylic acids, and imides of unsaturated carboxylic acids.

3. The process according to claim 1, wherein the at least one thermoplastic copolymer A comprises:
   A1: 65 to 80% by weight, based on the total copolymer A, of the at least one vinylaromatic monomer A1, selected from styrene, α-methylstyrene, or mixtures of styrene and α-methylstyrene; and
   A2: 20 to 35% by weight, based on the total copolymer A, of the at least one further ethylenically unsaturated monomer A2, selected from acrylonitrile or mixtures of acrylonitrile and methacrylonitrile.

4. The process according to 1, claim wherein the at least one graft copolymer B, comprises:
   B1: 55 to 75% by weight, based on the graft copolymer B, at least one graft base B1 obtained by emulsion polymerization of:
       B11: 90 to 99.9% by weight, based on the graft base B1, at least one $C_1$-$C_8$ alkyl(meth)acrylate, as monomer B11;
       B12: 0.1 to 10% by weight, based on the graft base B1, at least one polyfunctional, cross-linking monomer B12; wherein the monomer B12 is selected from allyl(meth)acrylate, divinylbenzene, diallylmaleate, diallylfumarate, diallylphthalate, triallylcyanurate, triallylisocyanurate, and dihydrodicyclopentadienylacrylate; and
       B13 0 to 9.9% by weight, based on the graft base B1, at least one further copolymerizable, monoethylenically unsaturated monomer B13 different from B11 and B12, wherein the monomer B13 is selected from styrene, α-methylstyrene, $C_1$-$C_4$-alkylstyrene, acrylonitrile, methacrylonitrile, isoprene, butadiene, chloroprene, methyl(meth)acrylate, alkylenglycol-di(meth)acrylate, and vinylmethylether;
   wherein the sum of B11, B12, and optional B13 is 100% by weight, based on all monomers of graft base B1; and
   B2: 25 to 45% by weight, based on the graft copolymer B, at least one graft shell B2, wherein at least one graft shell B2 is obtained by emulsion polymerization in the presence of at least one graft base B1 of:
       B21: 70 to 80% by weight, based on the graft shell B2, at least one vinylaromatic monomer B21, wherein the monomer B21 is selected from styrene, α-methylstyrene, and mixtures of styrene and one further monomer selected from α-methylstyrene, p-methylstyrene, and $C_1$-$C_4$-alkyl(meth)acrylate; and
       B22: 20 to 30% by weight, based on the graft shell B2, at least one ethylenically unsaturated monomer B22, wherein the monomer B22 is selected from acrylonitrile or mixtures of acrylonitrile and at least one further monomer selected from methacrylonitrile, acrylamide, vinylmethylether, anhydrides of unsaturated carboxylic acids, and imides of unsaturated carboxylic acids;
wherein the total sum of graft base(s) B1 and graft shell(s) B2 is 100% by weight.

5. The process according to claim 1, wherein the graft copolymer B comprises:
   B1: 50 to 70% by weight, based on the graft copolymer B, of the at least one graft base B1;
   B2': 10 to 30% by weight, based on the graft copolymer B, at least one graft shell B2', which is obtained by emulsion polymerization, in presence of graft base B1, of:
       B21': 100% by weight, based on graft shell B2', at least one monomer B21', selected from styrene, α-methylstyrene, or a mixture of styrene and at least one further monomer selected from α-methylstyrene, p-methylstyrene, and $C_1$-$C_4$-alkyl(meth)acrylate; and
   B2": 20 to 40% by weight, based on the graft copolymer B, at least one graft shell B2", which is obtained by emulsion polymerization, in presence of graft base B1 grafted with B2', of:
       B21": 50 to 95% by weight, based on the graft shell B2", at least one monomer B21", selected from styrene, α-methylstyrene, or mixtures of styrene and at least one further monomer selected from α-methylstyrene, p-methylstyrene, and $C_1$-$C_4$-alkyl(meth)acrylate; and B22": 5 to 50% by weight, based on the graft shell B2", at least one monomer B22", selected from acrylonitrile or mixtures of acrylonitrile and at least one further monomer selected from methacrylonitrile, acrylamide, vinylmethylether, anhydrides of unsaturated carboxylic acids, and imides of unsaturated carboxylic acids.

6. The process according to claim 1, wherein the graft copolymer B comprises at least two graft copolymers B-I and B-II, wherein:

graft copolymer B-I has a mean particle diameter $D_w$ in the range of 60 to 200 nm; and graft copolymer B-II has a mean particle diameter $D_w$ in the range of 300 to 800 nm.

7. The process according to claim 1, wherein the at least one vinylaromatic monomer B21 is styrene and/or α-methylstyrene and the at least one ethylenically unsaturated monomer B22 is acrylonitrile or a mixture of acrylonitrile and methacrylonitrile.

8. The process according to claim 1, wherein the at least one surfactant S1 and/or S2 are one or more anionic surfactants, selected from alkyl sulfonic acids, arylalkyl sulfonic acids, fatty acids and salts thereof, having an aliphatic linear or branched hydrocarbon chain of 5 to 30 carbon atoms.

9. The process according to claim 1, wherein the volume concentration of the surfactant S2 in step b) is in the range of 0.5 to 0.7 mol/m³, based on the volume of the graft copolymer B latex particles.

10. The process according to claim 1, wherein the preparation of the graft base B1 via emulsion polymerization in step a) and/or the preparation of the graft copolymer B via emulsion polymerization in step b) is carried out under addition of at least one persulfate as initiator, wherein the initiator is added in step a) and/or b) in an amount of 0.01 to 1% by weight, based on the total amount of monomers used in the respective emulsion polymerization step.

11. The process according to claim 1, wherein the thermoplastic moulding composition comprises 5 to 60% by weight, based on the total moulding composition, at least one further polymer component C selected from polycarbonates, polyamides, and polyesters.

12. The process according to claim 1, wherein the thermoplastic moulding composition comprises 0.01 to 10% by weight, based on the total moulding composition, at least one further additive K, selected from colorants, pigments, lubricants or mould-release agents, stabilizers, antistatic agents, flame retardants, and fillers.

13. The process according to claim 1, wherein the at least one graft copolymer B latex obtained in step b) comprises less than 0.1% by weight, based on the total solid content of the graft copolymer B, of coagulated latex particles.

14. The process according to claim 1, wherein the thermoplastic moulding composition obtained exhibits a specific surface resistivity, determined according to IEC 62631-3-2: 2015, in the range of $6.4*10^{14}$ to $9.14*10^{14}$ Ohm.

15. The process according to claim 1, wherein:

the surfactant S2 or the surfactants S2 and S1 are selected from arylalkyl sulfonates and alkyl sulfonates having an aliphatic linear or branched hydrocarbon chain of 5 to 30 carbon atoms;

the precipitation solution comprises at least one magnesium salt; and the concentration of the surfactant S2 is selected so that the weight ratio of sulfur (S) to magnesium (Mg) in the thermoplastic moulding composition obtained is below 2.6.

* * * * *